(12) United States Patent
Testani

(10) Patent No.: US 9,130,373 B2
(45) Date of Patent: Sep. 8, 2015

(54) UNIVERSAL POWER CONTROL DEVICE

(71) Applicant: Pass & Seymour, Inc., Syracuse, NY (US)

(72) Inventor: Anthony Testani, Camillus, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 289 days.

(21) Appl. No.: 13/792,974

(22) Filed: Mar. 11, 2013

(65) Prior Publication Data
US 2013/0278168 A1   Oct. 24, 2013

Related U.S. Application Data

(60) Provisional application No. 61/635,600, filed on Apr. 19, 2012.

(51) Int. Cl.
*H05B 37/02* (2006.01)
*G05F 3/04* (2006.01)
*H02J 3/00* (2006.01)
*H05B 39/04* (2006.01)

(52) U.S. Cl.
CPC ... *H02J 3/00* (2013.01); *G05F 3/04* (2013.01); *H05B 37/02* (2013.01); *H05B 39/04* (2013.01); *Y10T 307/406* (2015.04)

(58) Field of Classification Search
USPC ............ 315/250, 291, 307, 362; 307/31, 137, 307/139, 140; 323/282, 318, 319
See application file for complete search history.

(56) References Cited

U.S. PATENT DOCUMENTS

| | | | |
|---|---|---|---|
| 5,038,081 A | 8/1991 | Maiale, Jr. et al. | |
| 5,248,919 A * | 9/1993 | Hanna et al. | 315/291 |
| 5,399,940 A | 3/1995 | Hanna et al. | |
| 5,430,356 A | 7/1995 | Ference et al. | |
| 5,519,263 A | 5/1996 | Santana, Jr. | |
| 5,798,581 A | 8/1998 | Keagy et al. | |
| 6,347,028 B1 | 2/2002 | Hausman, Jr. et al. | |
| 6,380,692 B1 | 4/2002 | Newman, Jr. | |
| 6,813,720 B2 | 11/2004 | Leblanc | |
| 6,969,959 B2 | 11/2005 | Black et al. | |
| 7,005,762 B2 | 2/2006 | Black et al. | |
| 7,071,634 B2 | 7/2006 | Johnson et al. | |
| 7,166,970 B2 | 1/2007 | Johnson et al. | |
| 7,247,999 B2 | 7/2007 | Kumar | |
| 7,382,100 B2 | 6/2008 | Johnson et al. | |
| 7,480,128 B2 | 1/2009 | Black | |
| 7,619,365 B2 | 11/2009 | Davis et al. | |
| 7,687,940 B2 | 3/2010 | Mosebrook et al. | |
| 7,719,817 B2 | 5/2010 | Newman, Jr. | |
| 7,830,042 B2 | 11/2010 | Keagy et al. | |
| 7,859,815 B2 | 12/2010 | Black et al. | |
| 8,022,577 B2 | 9/2011 | Grice | |
| 8,212,424 B2 | 7/2012 | Mosebrook et al. | |
| 8,212,425 B2 | 7/2012 | Mosebrook et al. | |
| 8,786,137 B2 * | 7/2014 | Chou et al. | 307/116 |
| 2009/0204239 A1 * | 8/2009 | Netzel et al. | 700/83 |
| 2010/0289430 A1 * | 11/2010 | Stelzer et al. | 315/307 |

* cited by examiner

*Primary Examiner* — Douglas W Owens
*Assistant Examiner* — Thai Pham
(74) *Attorney, Agent, or Firm* — Daniel P. Malley; Bond Schoeneck & King, PLLC

(57) ABSTRACT

The present invention is directed to an intelligent dimmer that is capable of "learning" the type of load it is controlling, and adjusts its operating parameters accordingly. The present invention can adaptively drive electrical loads over a wide range of wattages. The intelligent dimmer of the present invention is configured to automatically calibrate itself based on the load current demands of a particular electrical load. The intelligent dimmer of the present invention also adaptively limits in-rush currents to extend the life expectancy of the solid state switching components used therein.

36 Claims, 21 Drawing Sheets

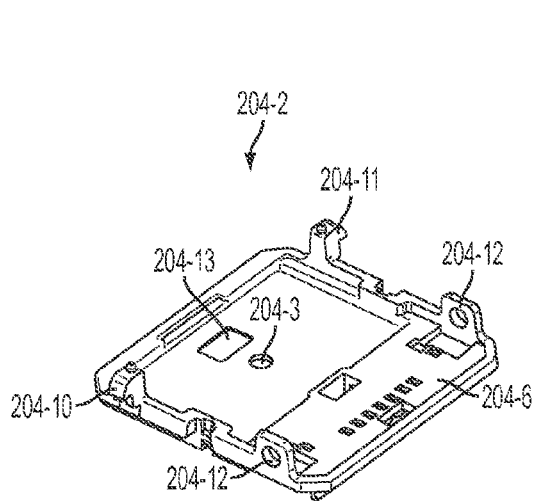
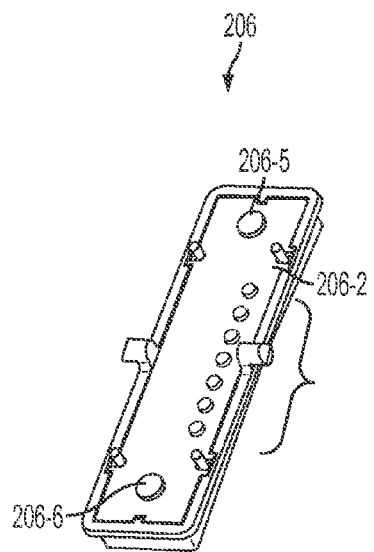
FIG. 29  FIG. 30
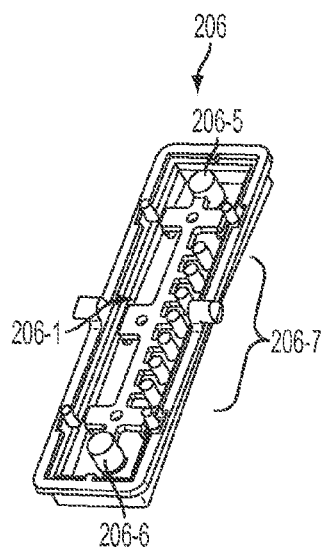
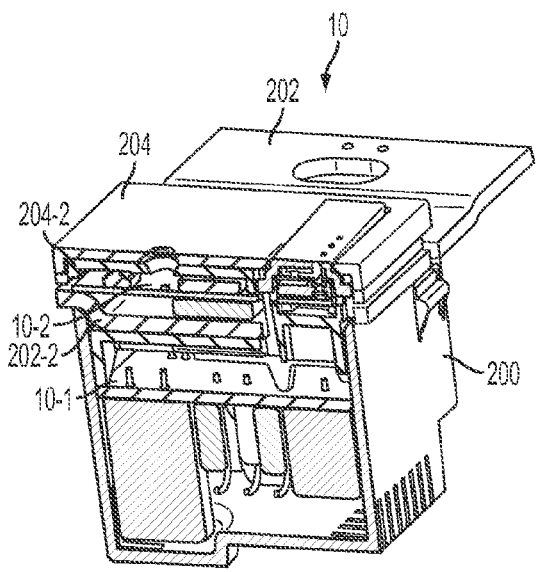
FIG. 31  FIG. 32

UNIVERSAL POWER CONTROL DEVICE

CROSS-REFERENCE TO RELATED APPLICATIONS

This is application claims priority to U.S. Provisional Patent Application Ser. No. 61/635,600 filed on Apr. 19, 2012, the content of which is relied upon and incorporated herein by reference in its entirety, and the benefit of priority under 35 U.S.C. §119(e) is hereby claimed.

BACKGROUND OF THE INVENTION

1. Field of the Invention

The present invention relates generally to electrical wiring devices, and particularly to power control wiring devices such as dimmer and fan speed control devices.

2. Technical Background

In most residences, a simple ON/OFF switch may be the primary way people control the home's lighting fixtures or air-circulating fan fixtures. One obvious drawback to using simple ON/OFF switches to control these devices is experienced by the homeowner when he pays the electrical bill—a given light (or fan) is either ON or OFF—a simple switch is thus unable to vary the amount of light (and hence the amount of power consumed). Stated differently, by controlling light intensity or fan speed in accordance with needed or desired parameters, electricity usage is reduced, saving money and natural resources. In accordance with the present invention, therefore, a power control device refers to an electrical control device that may be employed to adjust the amount of current delivered to any variable electrical load, such as a light or a motor.

When the electric load is a lighting device, the power control device is commonly referred to as a dimmer. For example, when a light is dimmed 25%, a dimmer saves about 20% of the electricity required. When dimmed by 50%, it saves 40% of the electricity. Second, a dimmer greatly extends lamp life because it reduces strain on the filament. When dimmed 25%, a lamp lasts 4 times longer than it would at full power, and dimmed by 50%, it will last as much as 20 times longer. If the power control device is configured to control a motor, such as a fan motor, the power control device is referred to as a motor speed controller. Motor speed controllers are also used to control the speed of machinery such as power tools, electric drills, chair lifts, stationary machinery, and other such variable speed motor driven elements.

Power control devices are typically packaged in a wiring device form factor for installation in a wall outlet box. The wiring device may include one or more power control devices within the device housing. For example, wiring devices that are equipped with both fan motor control and lighting control features are ubiquitous. The exterior of the wiring device includes either screw terminals or wire terminals for subsequent connection between the AC power source and the load. The conventional wiring device form factor also provides a user accessible interface that includes one or more switch mechanisms such as buttons, levers, dials, slide switches, and other such input control mechanisms that permit a user to vary the power to a load or turn it ON/OFF.

Prior to device installation, wiring from the AC power source and wiring to the load(s) are disposed inside the outlet box. The outlet box is usually located proximate to the load being controlled. The device is installed by connecting the wiring inside the outlet box to the appropriate wiring device terminals disposed on the exterior of the wiring device. The power control wiring device is then inserted into the outlet box and attached to the outlet box using one or more fasteners. A cover plate is installed to complete the installation. One of the drawbacks associated with older conventional power control devices relates to the fact that many were often installed without a neutral wire being routed into the device box. What is needed therefore is a power control device that can be employed in any structure being retrofitted or remodeled. Stated differently, a power control device is needed that can work with existing wiring, i.e., whether the neutral is present or not present in the device box.

Often, a residence includes a three way lighting arrangement whereby one light fixture may be operated by two separate three-way switches. Often, one three-way switch is installed at an upstream location while a second three-way switch is installed at a downstream location. This allows a resident to conveniently turn the lights ON or OFF from two different locations. Unfortunately, this may lead to difficulties in when a structure or space is being retrofitted, since certain conventional dimmers may only be installed at one of the three way switch locations. This requires the homeowner to know how the existing wiring is disposed in the room (behind the plaster or sheet rock). What is needed therefore is a dimmer that can be installed at either three-way switch location.

Turning now to so-called "green" issues, the public has developed an increased awareness of the impact that energy generation has on the environment. Moreover, as the economies of countries such as Brazil, India, China, etc. improve and develop, their need for energy resources increases accordingly. As such, the global demand for energy has risen sharply, while the supply of planet earth's resources remains fixed. In light of the pressures of supply and demand, the cost of energy resources will only increase. There is thus a need to use limited energy resources more wisely and more efficiently. More efficient light sources and electrical fixtures have been developed to replace the conventional incandescent lighting devices in response to this need. For example, compact fluorescent lights (CFL) and light emitting diode (LED) devices are far more efficient than conventional incandescent lights and thus provide homeowners/tenants with an acceptable level of service while using less energy and incurring lower costs.

One of the drawbacks of conventional dimmer devices relates to the fact that incandescent lights, fluorescent lights, MLV lighting, ELV lighting, CFL devices and LED lighting may have different electrical operating characteristics. Dimmers have a solid state switching component that turns the lamp on during a user adjustable portion of each line frequency cycle and turns the lamp off during the remaining portion of the cycle. Dimmers whose switching components turn the load on at a zero crossing of the line frequency and then off at a user adjustable phase angle have been referred to as reverse phase dimmers. Those that turn the load on at the user adjustable phase angle and then off at the following zero cross have been referred to as forward phase dimmers. A particular type of lamp might be less susceptible to unwanted effects such as flickering using one type of dimmer or the other. Moreover, the life expectancy of the both the dimmer and the lighting may be adversely affected if the dimmer/lighting device are not properly matched. Of course, it is cumbersome to have to replace the dimmer simply whenever a lamp having different electrical operating characteristics is put in the light fixture.

Accordingly, a need exists for a power control device that can drive electrical loads over a wide range of wattages. An intelligent dimmer that is capable of "learning" the type of fixture it is controlling, and adjusts its operating parameters accordingly. For example, an intelligent dimmer is needed that can automatically calibrate the dimmer based on the load current demands of a particular electrical load. The intelligent dimmer should also be able to adaptively limit in-rush currents that are known to shorten the life expectancy of the solid state switching components used in dimmer products.

SUMMARY OF THE INVENTION

The present invention addresses the needs described above by providing an intelligent dimmer that can be employed in any structure being retrofitted or remodeled. The present invention may be installed in existing wiring, i.e., whether the neutral is present or not present in the device box. The intelligent dimmer of the present invention may also be installed at either three-way switch location in a retrofit without regard to how the electrical wiring is disposed in the existing structure. The present invention is directed to an intelligent dimmer that is capable of "learning" the type of load it is controlling, and adjusts its operating parameters accordingly. The present invention can adaptively drive electrical loads over a wide range of wattages. The intelligent dimmer of the present invention is configured to automatically calibrate itself based on the load current demands of a particular electrical load. The intelligent dimmer of the present invention also adaptively limits in-rush currents to extend the life expectancy of the solid state switching components used therein.

One aspect of the present invention is directed to an electrical wiring device for use with an external three-way switch in a three-way switching arrangement. The device includes a housing assembly having a plurality of terminals at least partially disposed therein. The plurality of terminals includes a reversible terminal, a first traveler terminal and a second traveler terminal, the reversible terminal being configured to be coupled to an AC power source or an electrical load. A power regulation circuit is coupled to the plurality of terminals. The power regulation circuit is configured to provide at least one reference voltage derived from the AC power source and a zero cross signal substantially corresponding to a zero-crossing of an the AC power cycle of the AC power source. A switching mechanism includes a first throw coupled to the first traveler terminal, a second throw coupled to the second traveler terminal, and a common pole coupled to the reversible terminal. The switching mechanism is configured to connect the first traveler terminal to the common pole in a first switch state or the second traveler or the second traveler terminal to the common pole in a second switch state. An AC power routing circuit is coupled between the plurality of terminals and the power regulation circuit. The AC power routing circuit is configured to direct AC power to the power regulation circuit when the reversible terminal is connected to either the AC power source or the electrical load and when the switching mechanism and the external three-way switch are in any switch state. A regulation circuit is coupled to the power regulation circuit, the regulation circuit being configured to regulate an amount of power provided to the electrical load as a function of the zero-crossing signal.

In another aspect the present invention is directed to an electrical wiring device for use with an external three-way switch in a three-way switching arrangement. The device includes a housing assembly having a plurality of terminals at least partially disposed therein. The plurality of terminals includes a reversible terminal, a first traveler terminal and a second traveler terminal, the reversible terminal being configured to be coupled to an AC power source or an electrical load. A power regulation circuit includes a series pass element coupled to the reversible terminal. A switching mechanism is switchable between a first switch state where the series pass element is coupled to the first traveler terminal and a second switch state where the series pass element is coupled to the second traveler terminal. An AC power routing circuit is coupled to the reversible terminal, the first traveler terminal and the second traveler terminal. The AC power routing circuit has a return path coupled to the neutral terminal or the ground terminal, the AC power routing circuit being configured to direct AC power to the power regulation circuit whether the reversible terminal is connected to the AC power source or the electrical load and whether the switching mechanism is in the first switch state or the second switch state.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 2A is a block diagram of the AC power circuitry and FIG. 2B is a block diagram of the processing and logic circuitry;

FIG. 29 is an isometric view of the ON/OFF actuator cover depicted in FIG. 20;

FIGS. 30-31 are detailed isometric views of the dimmer actuator cover depicted in FIG. 20; and FIG. 32 is a cross-sectional view of the power control device depicted in FIG. 20.

DETAILED DESCRIPTION

Figure 1:
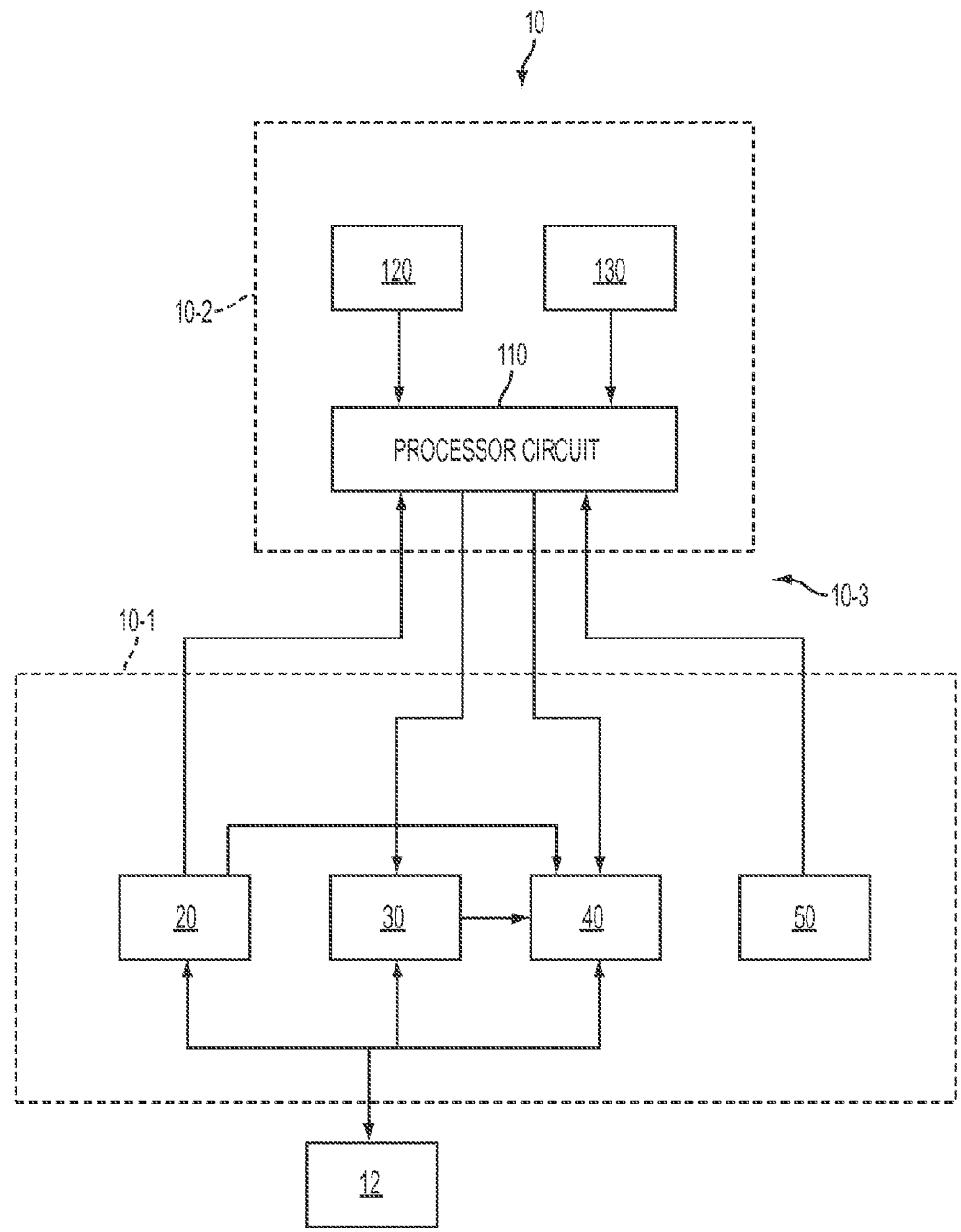
FIG. 1 is a general block diagram of a universal power control device in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the universal power control device of the present invention is shown in FIG. 1, and is designated generally throughout by reference numeral 10.

As embodied herein, and depicted in FIG. 1, a general block diagram of a universal power control device 10 in accordance with the present invention is disclosed. The device 10 includes a power handling printed circuit board (PCB) 10-1 and a processing or logic printed circuit board 10-2. The power handling PCB 10-1 is coupled to the logic PCB 10-2 by an interface 10-3. In another embodiment of the present invention, these circuits are disposed on a single printed circuit board (PCB). In yet another embodiment, for example, the power handling circuitry 10-1 is disposed on a printed circuit board adjacent a heat sink (not shown) whereas the logic circuitry 10-2 is disposed on a second PCB disposed adjacent to a cover portion.

The power handling circuit 10-1 is coupled to the AC power by way of the external AC terminals 12. If the device is employed as a single pole single throw (SPST) switch, the power control device is coupled to the hot connector (black) and inserted between the AC power source and the load to provide the load with variable power (e.g., dimmed power in a lighting application). The power control device 10 may also be employed in three-way switching arrangements. In this case, the device 10 provides terminal connections for a hot (or load) wire, a first traveler wire and a second traveler wire. In many retrofits, the device box may not have a neutral wire whereas in newer construction, or in newer retrofits, the device box does include a neutral wire. The present invention can accommodate a neutral wire and may also include a ground wire in at least one embodiment.

The power supply 20 is configured to rectify the AC power derived from terminals 12 to provide a high voltage DC supply for the relay circuit 40 and a +5 VDC supply for use by the logic circuitry 10-2. The power supply 20 further provides a zero-cross signal which is used by the processing circuitry 110 for timing purposes. The power handling circuit 10-1 also includes a load sensor 50 that is configured to provide the processing circuitry 110 with load current data. In one embodiment described below, the processing circuit 110 is configured to determine the type of lighting device that is installed by monitoring the load current data to determine whether the device 10 should operate using forward phase control or reverse phase control. Similarly, the processing circuit 110 also monitors the load current data to determine an optimal dimming voltage range for the specific lighting device type. In another embodiment described below (that has a neutral conductor or a ground conductor), the processor makes the dimming voltage range determination by monitoring the supply voltage. In another embodiment, this dimming range data is provided by the user via inputs 120 disposed in the logic circuitry portion 10-2 of the device 10.

The user input circuitry 120 provides the processing circuitry 110 with information that includes, among other things, lighting device type, calibration commands, load ON/OFF commands, and dimmer setting inputs. The processing circuitry 110 is configured to actuate the relay circuit 40 to turn the load ON or OFF based on user commands. The processing circuit 110 also provides the dimmer circuit 30 with dimmer commands in accordance with the user inputs and the load sensor 50 input. The dimmer circuit, of course, provides a dimmed power signal to the load via the AC terminals 12. As those skilled in the art will appreciate, dimming is accomplished in the reverse phase by switching the load current ON when the zero-crossing of the AC half-cycle is detected by the power detecting circuit 10-1 and turned OFF at a user adjustable phase angle. Conversely, in forward phase control, the load current is turned ON at the user adjustable phase angle and turned OFF when the next zero crossing is detected by the power detecting circuit. As those skilled in the art will appreciate, forward phase control is appropriate for conventional incandescent lighting, magnetic low voltage (MLV) lighting fixtures, conventional fluorescent lighting fixtures employing electronic ballasts (EFL), and halogen lighting. Reverse phase control is generally appropriate for electronic low voltage (ELV) lighting. Bulbs designed as higher efficiency 120V incandescent replacements, including LED bulbs and compact florescent lights (CFL) typically perform better with forward phase control. One of the universality features of the present invention is that the dimmer circuit may be employed in forward phase for certain optimized ELV, CFL and LED devices.

It will be apparent to those of ordinary skill in the pertinent art that modifications and variations can be made to the processing circuitry 110 of the present invention depending on the degree of processing sophistication provided in a given device. The processing circuitry 110 may employ random access memory (RAM), read only memory (ROM), I/O circuitry, and communication interface circuitry coupled together by a bus system. The buss typically provides data, address, and control lines between a processor and the other system components. Moreover, processor functions may be implemented using hardware, software, general purpose processors, signal processors, RISC computers, application specific integrated circuits (ASICs), field programmable gate array (FPGA) devices, customized integrated circuits and/or a combination thereof. Thus, embodiments of the present invention are not limited to any specific combination of hardware circuitry and/or software. Taken together, RAM and ROM may be referred to herein as "computer-readable media." The term "computer-readable medium," as used herein, refers to any medium that participates in providing data and/or instructions to the processor for execution. For example, the computer-readable media employed herein may include any suitable memory device including SRAM, DRAM, NVRWM, PROM, E$^2$PROM, Flash memory, or any suitable type of memory. In one embodiment, data and instructions may be provided to device 10 via electromagnetic waves. The processing circuitry 110 provides dimmer status information to the output display 130 such as the dimmable setting, lamp type, or user instruction.

Figure 2A:
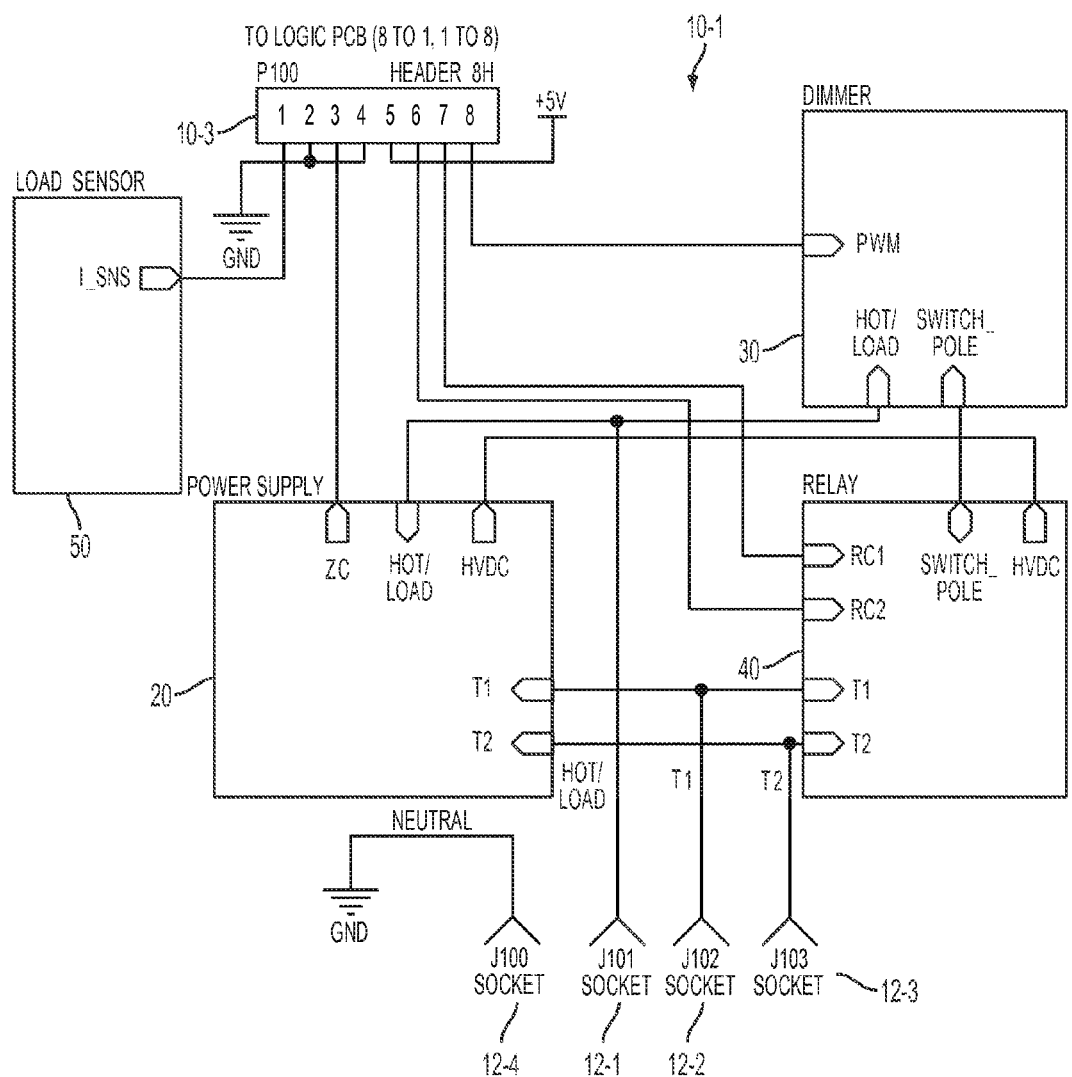
FIG. 2A-2B are block diagrams of the universal power control device in accordance with the first embodiment.

As embodied herein, and depicted in FIG. 2A, a block diagram of the AC power handling circuitry 10-1 in accordance with an embodiment of the present invention is disclosed. The terminals include a hot/load terminal 12-1, traveler terminal 12-2, traveler terminal 12-3 and neutral terminal 12-4. The neutral terminal 12-4 is employed as a means for referencing ground. In another embodiment of the invention (not shown), the terminals include a ground terminal to which the ground conductor of the electrical distribution system is connected. The ground terminal is also used, of course, to reference ground potential. In another embodiment both a ground terminal and a neutral terminal are provided and the ground reference is associated with either terminal depending on whether the neutral conductor or ground conductor is provided by the electrical distribution system. In each of these embodiments the device 10 also includes the traveler terminals (12-2, 12-3) for use in three-way switch arrangements. The hot/load terminal 12-1 may be connected to the hot terminal of the AC power source, or to the load. This capability is a feature of the power supply circuit 20 and the dimmer circuit 30 described below.

In one embodiment of the present invention, the interface device 10-3 is mounted on the power handling PCB 10-1 and is used to communicate power and logic signals between the PCB 10-1 and the PCB 10-2. In addition, the power supply 20 provides +5 VDC and a reference ground connection via device 10-3. The power supply 20 provides the processing circuitry 110 with the zero cross signal (ZC) and the load sensor 50 provides the processor circuitry with a sensor input (I sns) via an interface device 10-3. The processing circuitry 110 provides the relay control signals (RC1, RC2) and the dimmer control signal (PWM) via the interface 10-3.

Figure 2B:
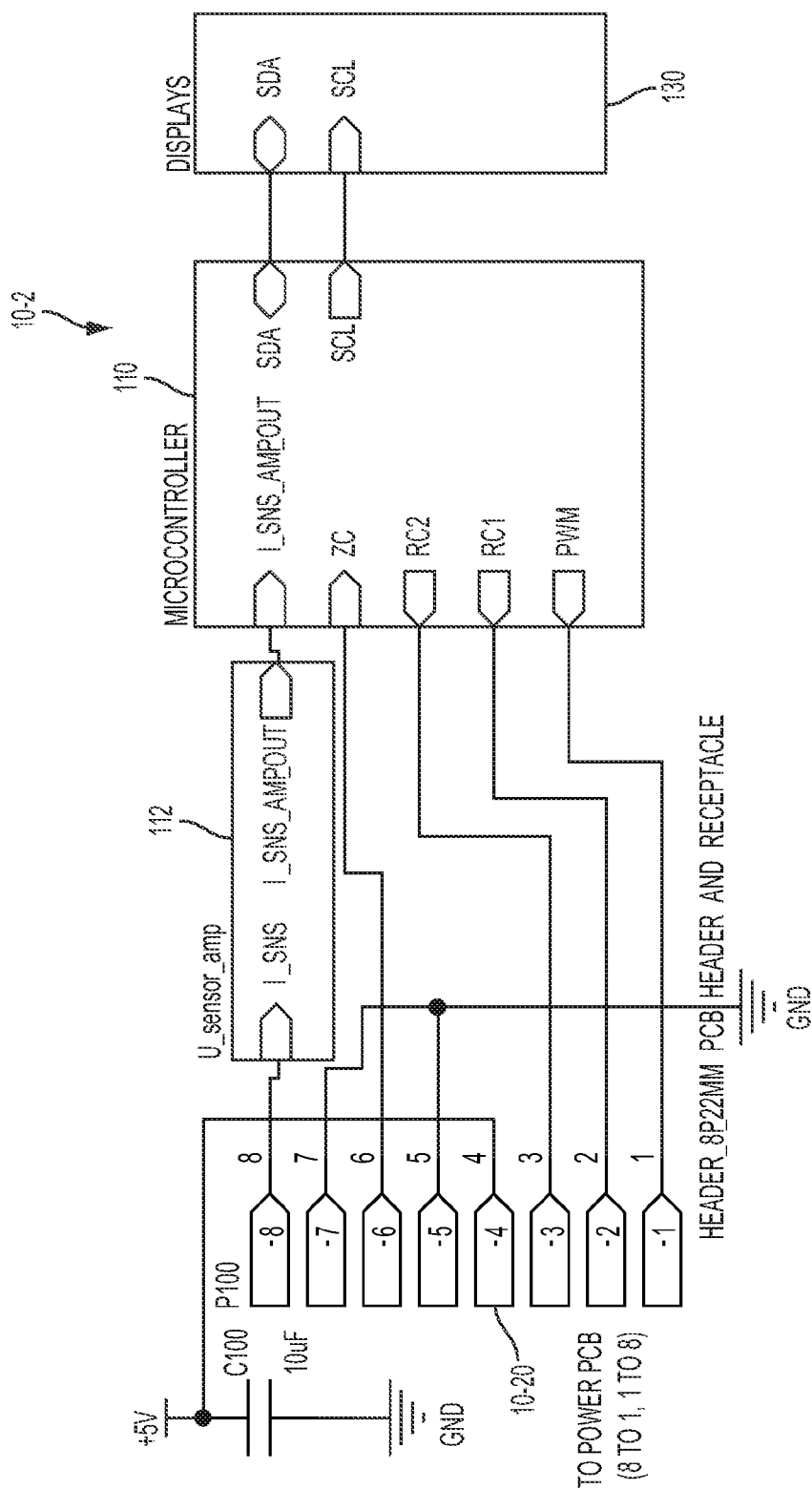

As embodied herein, and depicted in FIG. 2B, a block diagram of the logic PCB 10-2 in accordance with one embodiment of the invention is disclosed. The logic PCB 10-2 includes interface pins 10-20 that mates with the interface device 10-3 (FIG. 2A) to complete the bi-directional communication path between the power PCB 10-1 and the logic PCB 10-2. As noted above, power signals are conducted from the power handling circuit 10-1 to the logic circuit 10-2, and the logic signals are conducted from logic circuit 10-2 to the power handling circuit 10-1 as appropriate. The load sensor detection circuit 112 employs the load sensor 50 signal (I Sns) to generate a sensor detection signal (I SNS AMP OUT) for use by the processor circuitry 110. And as further shown in FIG. 2B, the processor circuit 110 provides the relay commands (RC1, RC2) and the dimmer command (PWM) to the power circuit 10-1 via the interface pins 10-20. The processor circuit 110 also provides output data to the display circuit 130 which is also disposed on the logic PCB 10-2. Although they are not shown in FIG. 2B, the processor circuit 110 is also connected to user-accessible input devices that convert user commands into electronic commands. The user commands may be provided to the processor circuit by way of, but not limited to, switches, buttons, electromagnetic signals (e.g., RF or optical) that may originate from a keyboard, mouse, or by voice commands.

Figure 3:
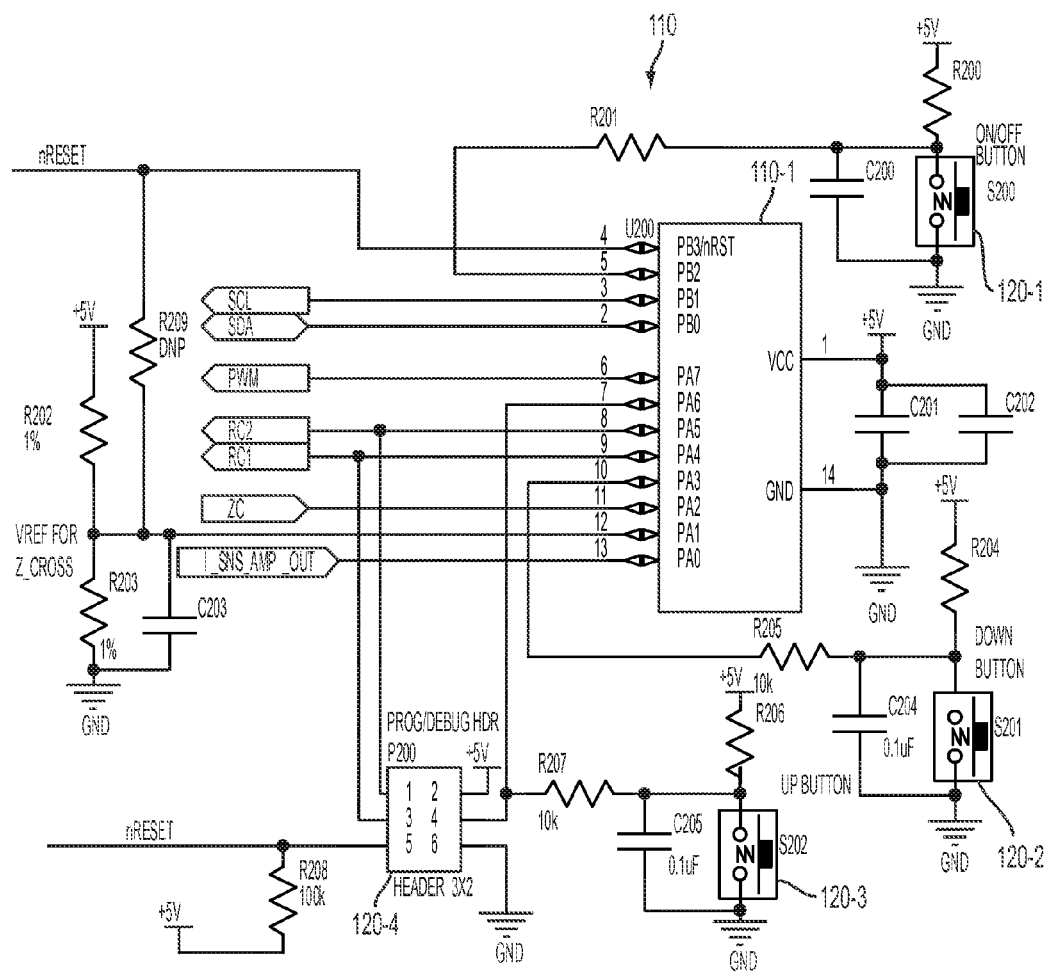
FIG. 3 is a detailed circuit diagram of a microcontroller circuit in accordance with the first embodiment of the present invention.

As embodied herein and depicted in FIG. 3, a detailed circuit diagram of a microcontroller circuit 110-1 in accordance with another embodiment of the present invention is disclosed. The processor circuit 110 is implemented using a microcomputer 110-1 which is selected based on a combination of characteristics including performance, cost, size and power consumption. In other words, the present invention contemplates a variety of models that provide the consumer with options that are closely suited to the consumers' needs and desires. The term "microcomputer performance" refers to an optimal combination of processing speed, memory size, I/O pin capability, and peripheral set capabilities (e.g., A/D converter, comparators, timers, serial bus, etc). As those skilled in the art will appreciate, any suitable processing device may be employed. In one embodiment of the present invention, the microcomputer is implemented by a device known as the "ATtiny44a", which is manufactured by the Atmel Corporation. In another embodiment that includes more features, the microcomputer is implemented using Atmel's "ATtiny84a" because the latter device offers more program memory than the former (i.e., 44a). Specifically, the ATtiny 84a includes 8 kB of program memory whereas the ATtiny 44a includes 4 kB of program memory. In one embodiment, the central processing unit (CPU) is operated at a clock frequency that is well below its rated frequency to thereby minimize power consumption.

It will be apparent to those of skilled in the pertinent art that modifications and variations can be made to the processor circuit 110 of the present invention depending on the amount and sophistication of features that are provided to the user. As noted previously, any suitable arrangement of hardware and/or software may be employed given the constraints of being disposed in an electrical wiring device. Thus, processor circuit 110 may be implemented using general purpose processors, signal processors, RISC computers, application specific integrated circuits (ASICs), field programmable gate array (FPGA) devices, customized integrated circuits and/or a combination thereof. With respect to the microcomputer 110-1 depicted in FIG. 3, any suitable microcomputer may be employed including, but not limited to those selected from the Microchip PIC12F family, the Freescale HCO8 family, the Texas Instruments MSP430 family, or the ST Micro STM8 family.

Turning now to FIG. 3 in more detail, a description of the data signals used, and provided by, microcontroller 110-1 is provided to aid the reader's understanding of this embodiment of the present invention. The "nReset" signal is generated after power is removed from the device and subsequently reapplied. This signal causes the device to re-perform calibration before providing service. In this embodiment, the microcomputer is connected to three user-operated buttons ("ON/OFF" button 120-1, "Down Button" 120-2, and "UP Button" 120-3). As shown, each button circuit is pulled to a logic high (+5V) by a 100K pull-up resistor. When a user depresses a button, its corresponding switch (S200, 5201, S202) is closed to ground the circuit such that the microcomputer reads a logic zero (0 V) to indicate that the user has made a command. With respect to the ON/OFF button 120-1, if the current state of the wiring device is "OFF," an actuation of the button 120-1 directs the microcontroller to send a signal via lines RC1, RC2 such that the relay turns the load "ON." When the user depresses the button 120-1 again, the same sequence plays out such that the relays turn the load "OFF." The "down button" circuit 120-2 and the "up button" circuit 120-3 operate in the same identical way that the ON/OFF button operates. Obviously, the difference is in the way that the microcomputer 110-1 interprets the commands. An actuation of the up-button 120-3 is interpreted as a command to increase the power delivered to the load, and an actuation of the down-button 120-2 is just the opposite.

In particular, when the down-button 120-2 is depressed, the software in the microcontroller changes the PWM signal such that the dimmer circuit 30 causes the lighting load to be incrementally dimmed. (Of course, the circuit may be used to slow an electric motor, e.g., a fan motor). Conversely, when the up-button 120-3 is depressed, the software in the microcontroller changes the PWM signal such that the dimmer circuit 30 causes the lighting load to be incrementally raised. The programming header 120-4 allows a person having the appropriate skill level to reprogram and/or debug the microcomputer 110 when button 120-3 is depressed in a predetermined sequence. The sequence is an indication to the microcomputer 110-1 that a data input device (a host computer interface, RF interface, keyboard, etc.) is being connected to header 120-4 and a reprogramming sequence is being initiated. The microcontroller 110-1 is also connected to the display circuit (shown in FIG. 4) by a serial clock signal (SCL) and a serial data signal (SDA) to provide a serial bit stream that corresponds to the appropriate device display settings (which are described below in conjunction with the circuit depicted in FIG. 4). The display settings are transmitted to the display circuit 130 when the settings are changed by a user input command and refreshed periodically. In one embodiment of the present invention, the microcomputer refreshes the settings every 300 msec, or at a 3.3 Hz rate. Of course, any suitable refreshing rate may be selected depending on the processor load.

The zero cross signal (ZC) is provided by the power PCB 10-1 and is paired with the VREF FOR Z-Cross signal. These signals comprise a differential input that is provided to a differential comparator disposed inside the microcomputer 110-1. The differential signal eliminates common-mode noise to prevent any false zero cross detections by the microcomputer 110-1. Stated differently, the reference timing provided by the zero cross detector of the present invention is substantially immunized from common mode noise to thereby substantially eliminate spurious timing signals. The purpose and function of the remaining signals will become apparent when their corresponding circuits are described herein.

Figure 4:
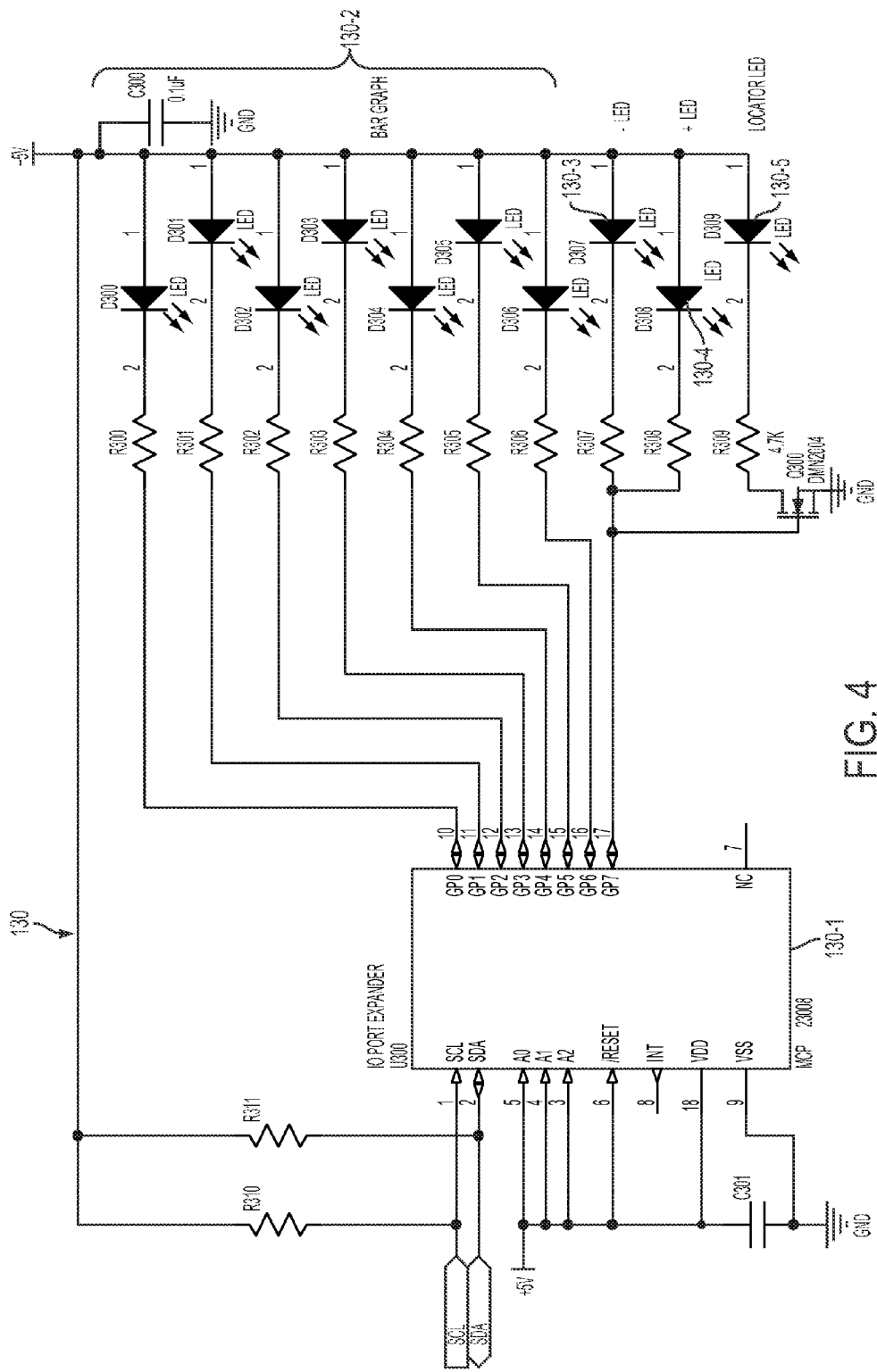
FIG. 4 is a detailed circuit diagram of a user display circuit in accordance with an embodiment of the present invention.

Referring to FIG. 4, a detailed circuit diagram of a user display circuit 130 in accordance with an embodiment of the present invention is disclosed. As alluded to above, the signals SCL and SDA are directed to the display circuit 130 which includes an I/O expander circuit 130-1. The I/O expander 130-1 is configured to receive the serial bit stream from the microcomputer 110-1 and convert it into a parallel data output for use by the display LEDs 130-2, 130-3, 130-4 and 130-5. In the embodiment of FIG. 4, seven (7) bar graph LEDs 130-2 are included to provide the user with an indication of the dimmer setting. For example, if one LED is ON and the other six LEDs are OFF, the bar graph indicates to the user that the light level setting is at its lowest setting. Conversely, if all seven (7) LEDs in the bar graph 130-2 are illuminated, the dimmer is at its highest setting.

The LEDs 130-3, 130-4, and 130-5 work in conjunction with the transistor 130-6. When the lighting load or the motor load is turned OFF by the relay circuit 40, the microcomputer transmits an appropriate bit command such that transistor 130-6 is turned ON. This causes current to flow through the locator LED 130-5. Once the lighting load is turned OFF, the LED 130-5 is turned ON to provide the user with a relatively small locator light that tells the user where to find the light switch in the darkened room. When current flows through LED 130-5, however, current cannot flow through the (−) LED 130-3 and the (+) LED 130-4 because both of these LEDs are biased OFF. In other words, these LEDs are presented with the same voltage potential at their anodes and cathodes such that current cannot flow. The purpose of the (−) LED and the (+) LED displays is to direct the user to the down button 120-2 and the up button 120-3, respectively. When the load is turned OFF, the dimming function is irrelevant and the −LED and the +LED are OFF to further indicate this fact. When these buttons are OFF, it is also a further indication that the load is OFF.

Figure 5:
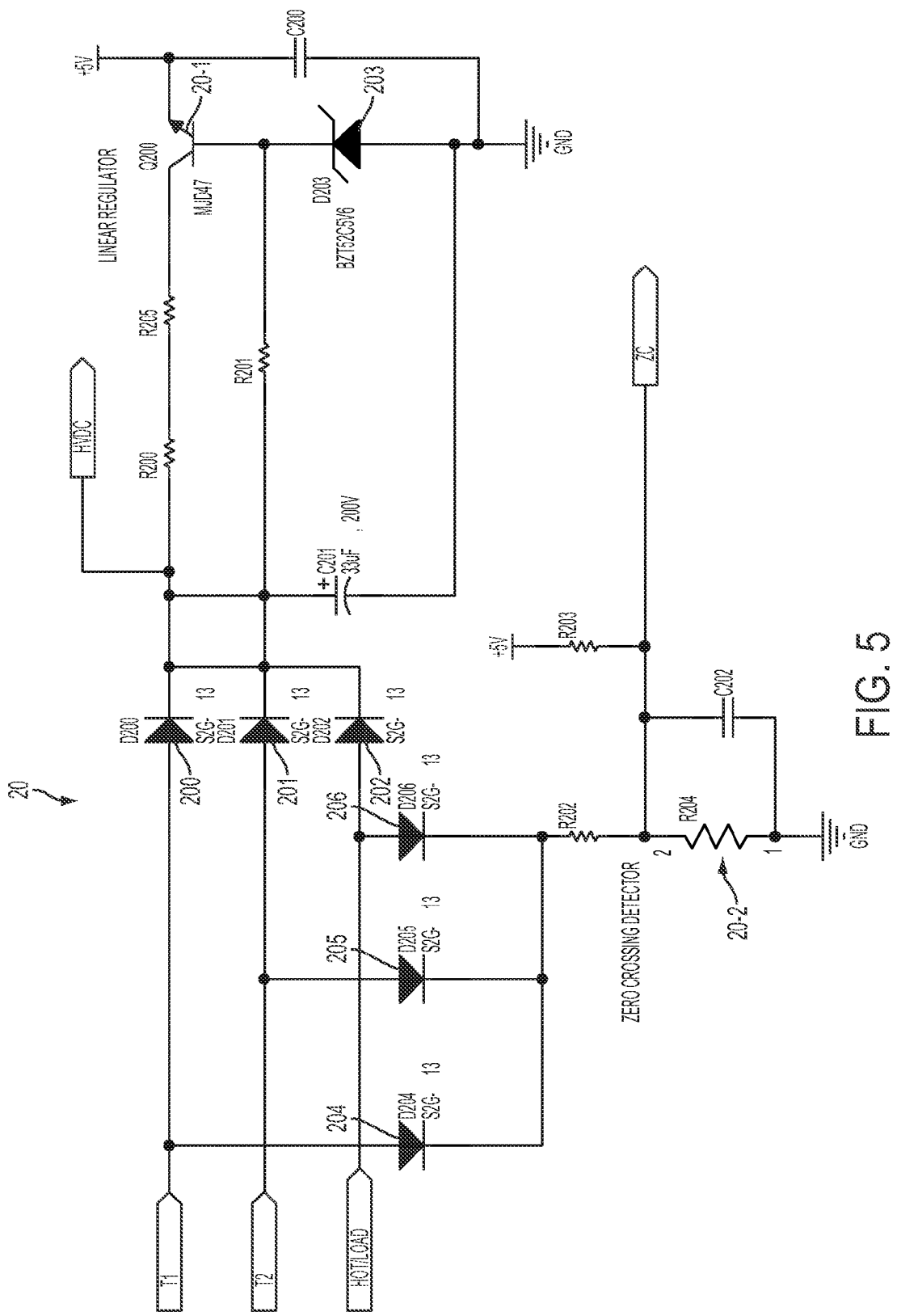
FIG. 5 is a detailed circuit diagram of a power supply in accordance with the first embodiment of the present invention.

Referring to FIG. 5, a detailed circuit diagram of the power supply circuit in accordance with an embodiment of the present invention is disclosed. The power supply includes a half-wave rectifier circuit that is comprised of diodes 200-202. The half-wave rectified DC signal is shown as HVDC. The half-wave rectified signal HVDC is employed by the regulator circuit 20-1 to further provide the power supply reference signals +5V and ground (GND) for the processor circuit 110.

The diodes 200-202 are disposed in parallel with each other such that the AC power signal may be provided to the power supply via the hot/load pin or either of the traveler pins (T1, T2). The utility of this parallel arrangement becomes more apparent in FIGS. 10A-10C and the description thereof. Needless to say, one of the features of the invention yields a universal dimmer that can be placed in either switch position of a retrofit three-way switch arrangement. Regardless of the switch position or which traveler pin the relay circuit 40 is connected, one of diodes 200-202 will furnish current to the power supply. Note also that diodes 204-206 (as a group) are placed in parallel with diodes 200-202 to provide the zero cross detector 20-2 with the half-wave rectified DC signal such that the zero cross detector 20-2 provides the zero cross (ZC) signal described above. Diodes 204-206 are also disposed in parallel with each other (like diodes 200-202) such that AC power signal may be provided to the zero-cross detection circuit 20-2 via the hot/load pin or either of the traveler pins (T1, T2). Regardless of the switch position, or which traveler pin the relay circuit 40 is connected to, one of diodes 204-206 will furnish current to the zero-cross detection circuit.

Figure 6:
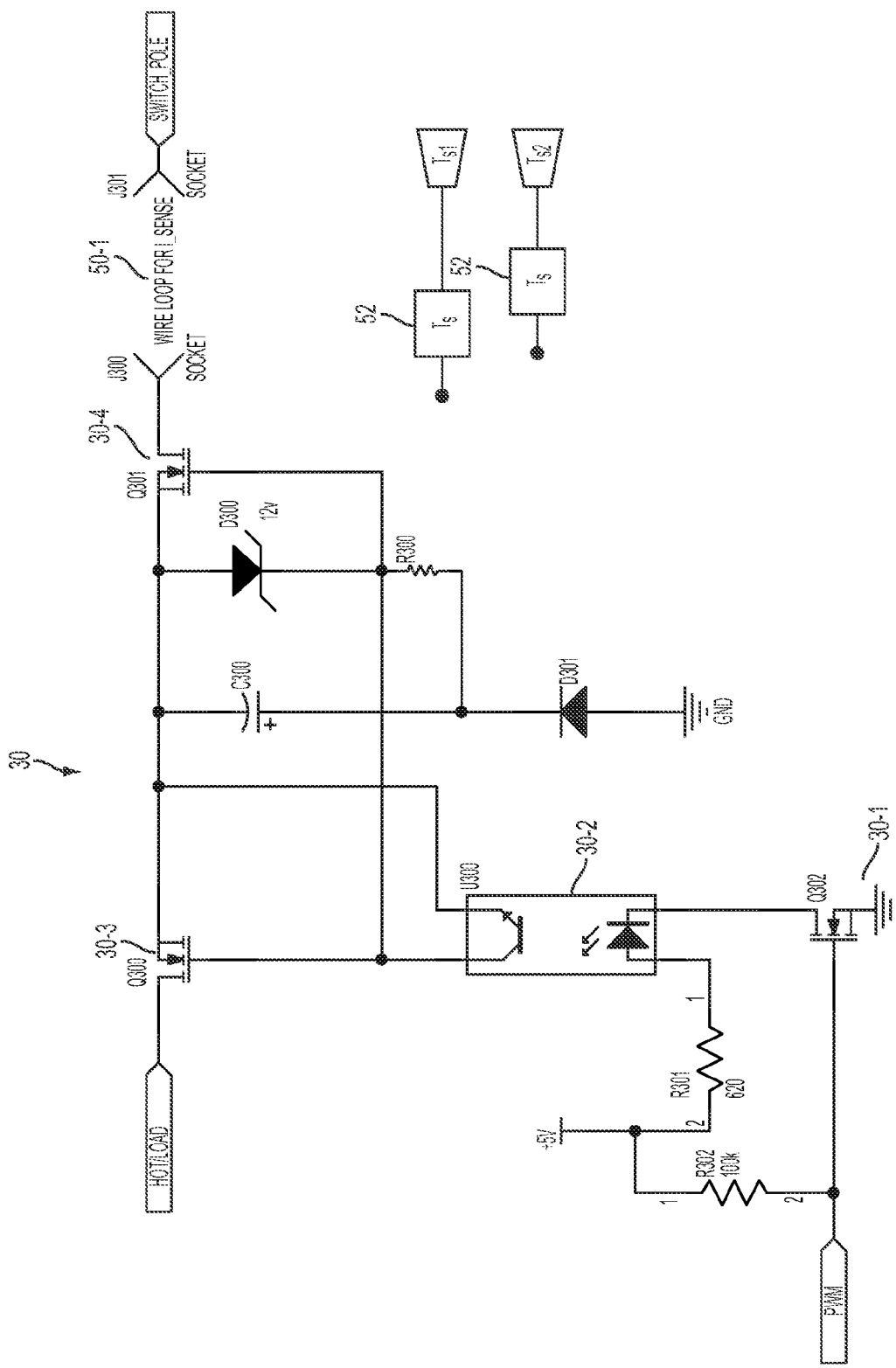
FIG. 6 is a detailed circuit diagram of a dimmer circuit in accordance with the first embodiment of the present invention.

Referring to FIG. 6, a detailed circuit diagram of the dimmer circuit in accordance with the present invention is disclosed. The microcomputer 110-1 controls the dimmer circuit 30 by way of the pulse width modulation (PWM) signal. The PWM signal propagates at logic levels (+5V, GND) and controls the operation of transistor 30-1. The width of the PWM pulse is varied to control the amount of power provided to the load, whether a lamp load or a motor load. The PWM signal comprises at least one pulse in an AC line cycle. In one embodiment of the invention, the PWM signal may provide a plurality of pulses within an AC half cycle. By using pulse width modulation, the present invention may used as a universal dimmer device that can control any type of lighting load by varying the duty cycle of the pulse. In operation, when the PWM signal is high, the transistor 30-1 conducts through the opto-coupler 30-2 to turn transistors 30-3 and 30-40N in accordance with the appropriate timing. Note that for the MOSFET implementation shown in FIG. 6, two transistors (30-3, 30-4) are required for operation. This is due to the internal body diode inherent in MOSFET technology; one MOSFET blocks a portion of the positive AC half cycle, and the other blocks a portion of the negative half-cycle to the load. The timing of the PWM pulse is of course controlled by the microcomputer and it is timed relative to the zero crossing of the AC cycle. As noted above, dimming is accomplished in the forward phase by switching the load current ON sometime after the zero-crossing of the AC half-cycle and turned OFF at the next zero-crossing of the AC waveform. Conversely, in reverse phase control, the load current is turned ON when the zero-crossing is detected and turned OFF sometime before the next zero-crossing is detected.

Because the PWM pulse is controlled by the microcomputer 110-1 with such a high degree of granularity while simultaneously monitoring the load current, the dimmer circuit may be employed in forward phase for certain optimized ELV, CFL and LED devices. The microcontroller transmits the PWM signal at a very low duty cycle until the I SNS AMP OUT signal (from the load current detector 112) indicates that there is a load current being drawn. If the fixture is an incandescent one, the load current in this region is substantially linear with respect to the PWM duty cycle. If the fixture is an LED fixture, the load current will not be present until the duty cycle has been increased to a certain threshold. Stated differently, the present invention employs a control loop that optimizes the PWM duty cycle for any given lighting load. Moreover, the microcomputer 110-1 may adjust the PWM signal to operate in forward phase or reverse phase by operation of the software. Again, as those skilled in the art will appreciate, forward phase control is appropriate for conventional incandescent lighting, magnetic low voltage (MLV) lighting fixtures, conventional fluorescent lighting fixtures employing electronic ballasts (EFL), and halogen lighting. Reverse phase control is generally appropriate for electronic low voltage (ELV) lighting. Bulbs designed as higher efficiency 120V incandescent replacements, including LED bulbs and compact florescent lights (CFL) typically perform better with forward phase control.

In one embodiment of the present invention, thermal sensors (Ts) 52 and 54 measure the heat being generated by the MOSFETs to obtain an estimate of power consumption. Thus, the sensor 52 is positioned proximate the transistors 30-3, 30-4 to obtain a measurement of the heat being generated thereby. The second sensor 54 is disposed in a region of the device that experiences the ambient temperature of the device 10. The microcomputer 110-1 is programmed to calculate the temperature difference to determine the amount of thermal energy generated by the transistors 30-3, 30-4. As those skilled in the art will appreciate, there is a relationship ($I^2R$) between the dissipated heat and the power.

(Again, with respect to FIGS. 10A-10C, the AC signal may be provided via the HOT/LOAD terminal and the dimmed signal by way of the SWITCH POLE terminal, or vice-versa, depending on which switch position the device 10 occupies in the three-way arrangement). Finally, note that wire-loop 50-1 is connected between transistor 30-4 and the SWITCH POLE terminal. The wire loop passes through the current sensor toroid 50 depicted in FIG. 8.

Figure 7:
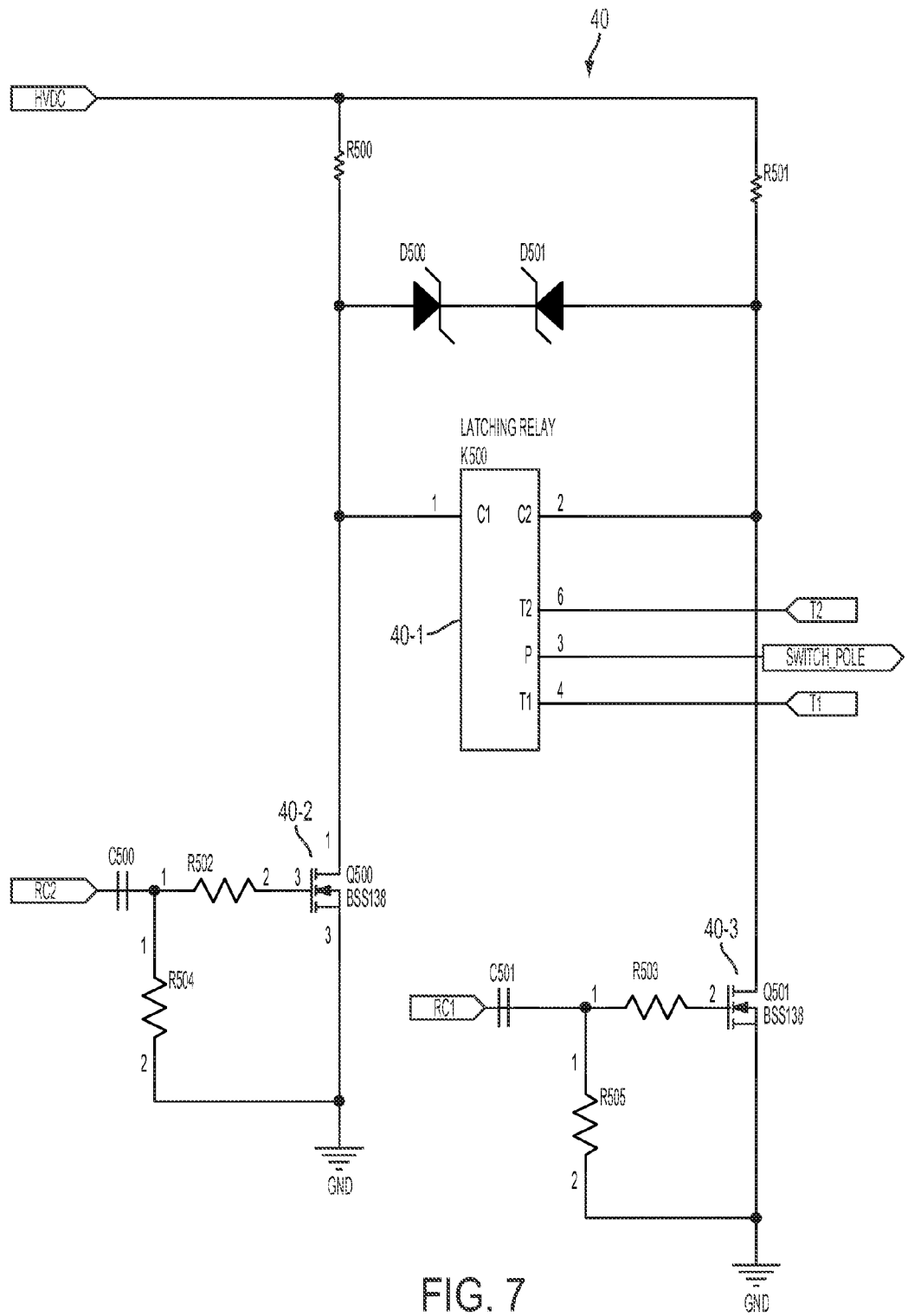
FIG. 7 is a detailed circuit diagram of a switch relay circuit in accordance with an embodiment of the present invention.

Referring to FIG. 7, a detailed circuit diagram of the switch relay circuit 40 in accordance with an embodiment of the present invention is disclosed. Again, the latching relay 40-1 may be configured to support both SPST applications as well as single pole double throw (SPDT) applications. In the SPDT application the relay 40-1 is moved between a first switch position that connects T1 and SWITCH POLE, and a second switch position that connects T2 with SWITCH POLE. The relay command signals RC1 and RC 2 are logic level signals that control transistors 40-3 and 40-2, respectively. If the latching relay is in the first switch position, the microcontroller 110-1 will provide a pulse via the relay command signal RC2 to cause the switch 40-1 to toggle into the second switch position. Conversely, if the latching relay is in the second switch position, the microcontroller 110-1 will provide a pulse via relay command signal RC1 to cause the relay 40-1 to toggle back into the first switch position.

Figure 8:
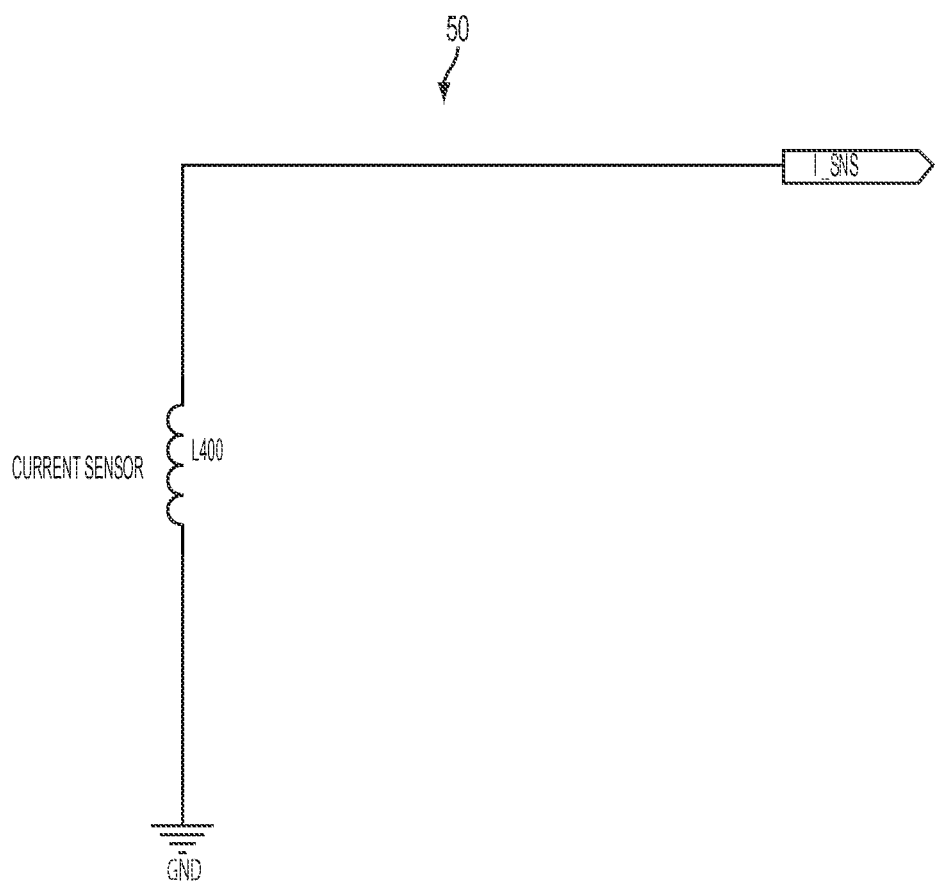
FIG. 8 is a diagrammatic depiction of a load sensor in accordance with an embodiment of the present invention.

Referring to FIG. 8, a diagrammatic depiction of the load sensor 50 in accordance with the present invention is disclosed. The current sensor 50 may be implemented as a toroid. As noted above, a wire loop connected to the SWITCH POLE terminal is disposed through the center of the toroid to create a transformer circuit. The wire loop 50-1 carries the load current and functions as the transformer primary.

Figure 9:
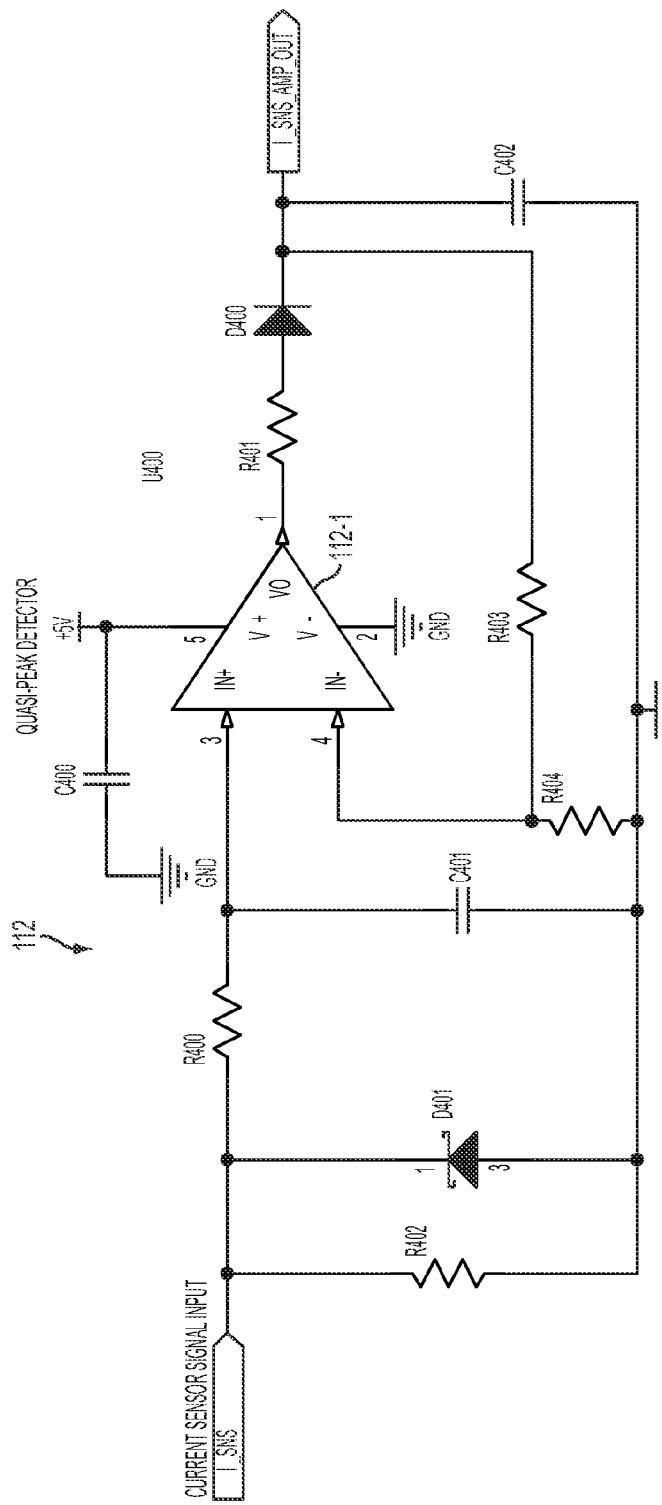
FIG. 9 is a detailed circuit diagram of a load sensor detector circuit in accordance with an embodiment of the present invention.

Referring to FIG. 9, a detailed circuit diagram of a load sensor detector circuit 112 in accordance with the present invention is disclosed. In this embodiment the detector 112 is configured as a threshold detector 112-1 that compares the I SNS signal from sensor 50 described above, with a predetermined threshold value. In this particular embodiment, the detector 112-1 provides a logic signal to the microcomputer 110-1. In one embodiment, if the load current is greater than about 10 mA, the detector 112-1 is configured to provide a logic one (+5V) signal. If the load current is below the threshold a logic zero (0 V) is provided. Those skilled in the art will appreciate that the threshold level is adjustable and depends on the level of sensitivity desired and the type of load. In this embodiment, the microcomputer 110-1 is signaled by I SNS AMP OUT when a minimal amount of current is being drawn by the load.

Figure 10A:
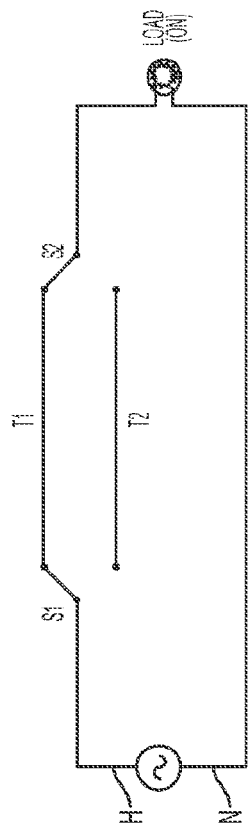
FIGS. 10A-10C are diagrammatic depictions of a three-way switch arrangement in accordance with the present invention.
Figure 10B:
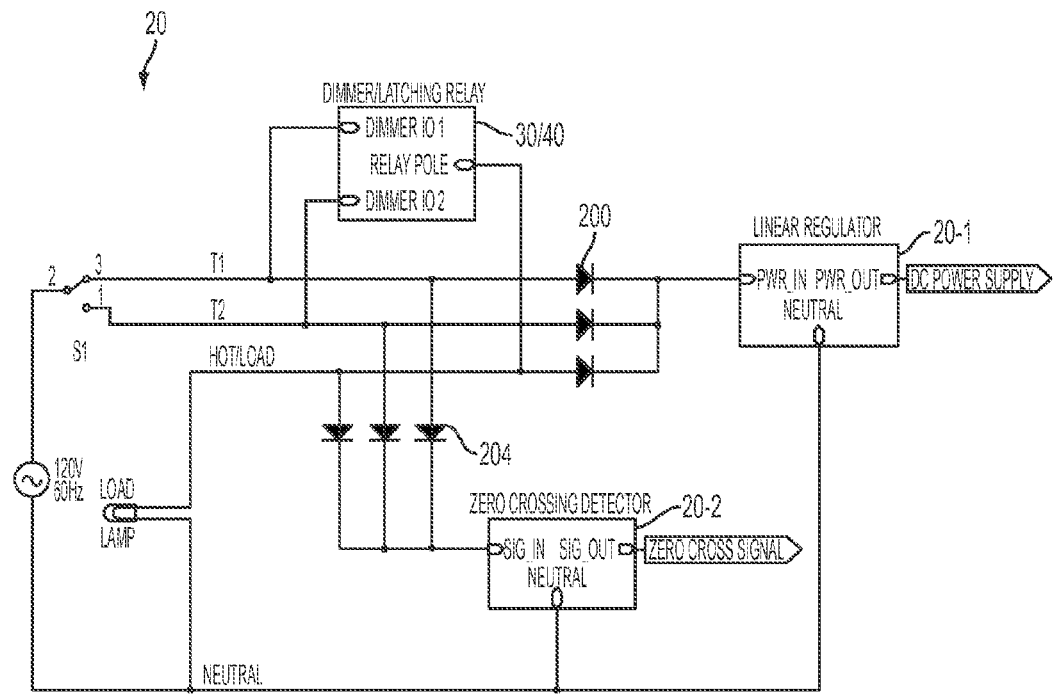
Figure 10C:
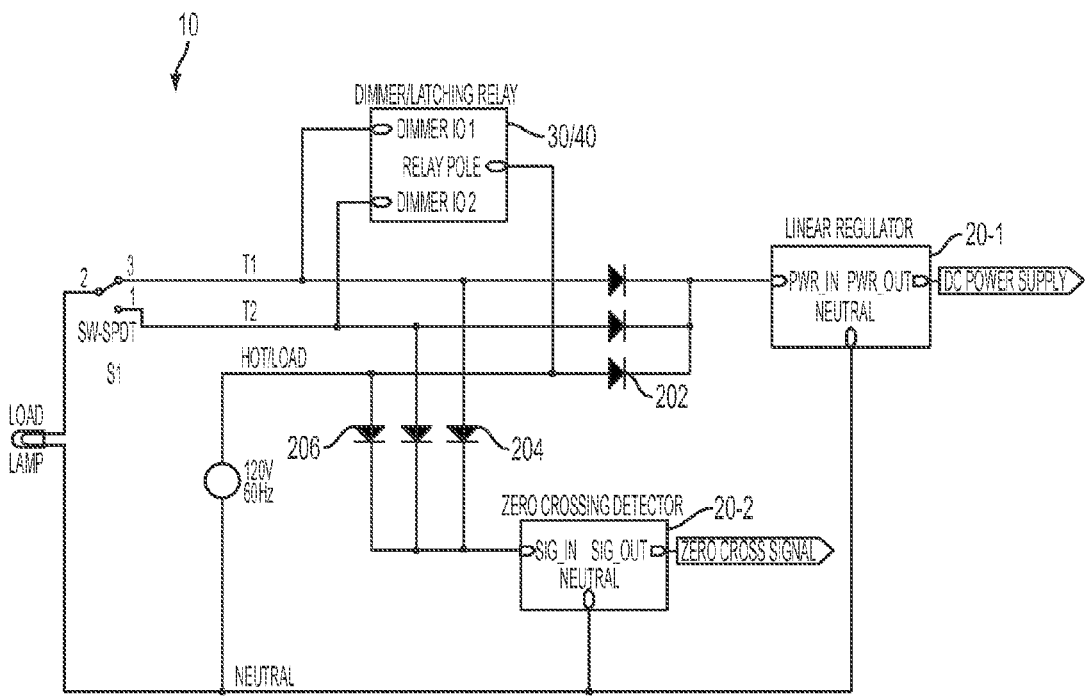

As embodied herein and depicted in FIGS. 10A-10C, diagrammatic depictions of a three-way switch arrangement in accordance with the present invention are disclosed. FIG. 10A shows a typical three-way switch arrangement wherein the line voltage (i.e. 120 VAC) is connected to the pole of a first SPDT switch S1 and the load is connected to the pole of a second SPDT switch S2. In this diagram, the load L is ON by virtue of the switch positions of S1 and S2. Toggling either S1 or S2 into a second switch position will turn the load OFF. The present invention may replace either one of the switches S1 and S2.

FIG. 10B shows device 10 of the present invention being connected to switch S1 in FIG. 10A. Thus, the hot AC line signal is directed into the dimmer/latching switch 30/40 via the T1 terminal, and further directed into the regulator 20-1 via diode 200 and the zero-cross detector 20-2 via diode 204. The dimmed power is provided to the load via the HOT/LOAD terminal. If the device 10 is switched such that AC power is provided via the T2 terminal, the diode arrangement (201,205) ensures that AC power is directed to the regulator and the zero-cross detector.

FIG. 10C shows device 10 of the present invention being connected to switch S2 in FIG. 10A. In this configuration, the AC hot is directed into the dimmer/relay circuits 30/40 via the relay pole line; dimmed power is provided to the load via terminal T1. Because of the diode circuit described previously, AC hot is provided to the regulator 20-1 via diode 202 and to ZC Detector 20-2 via diode 206.

Figure 11:
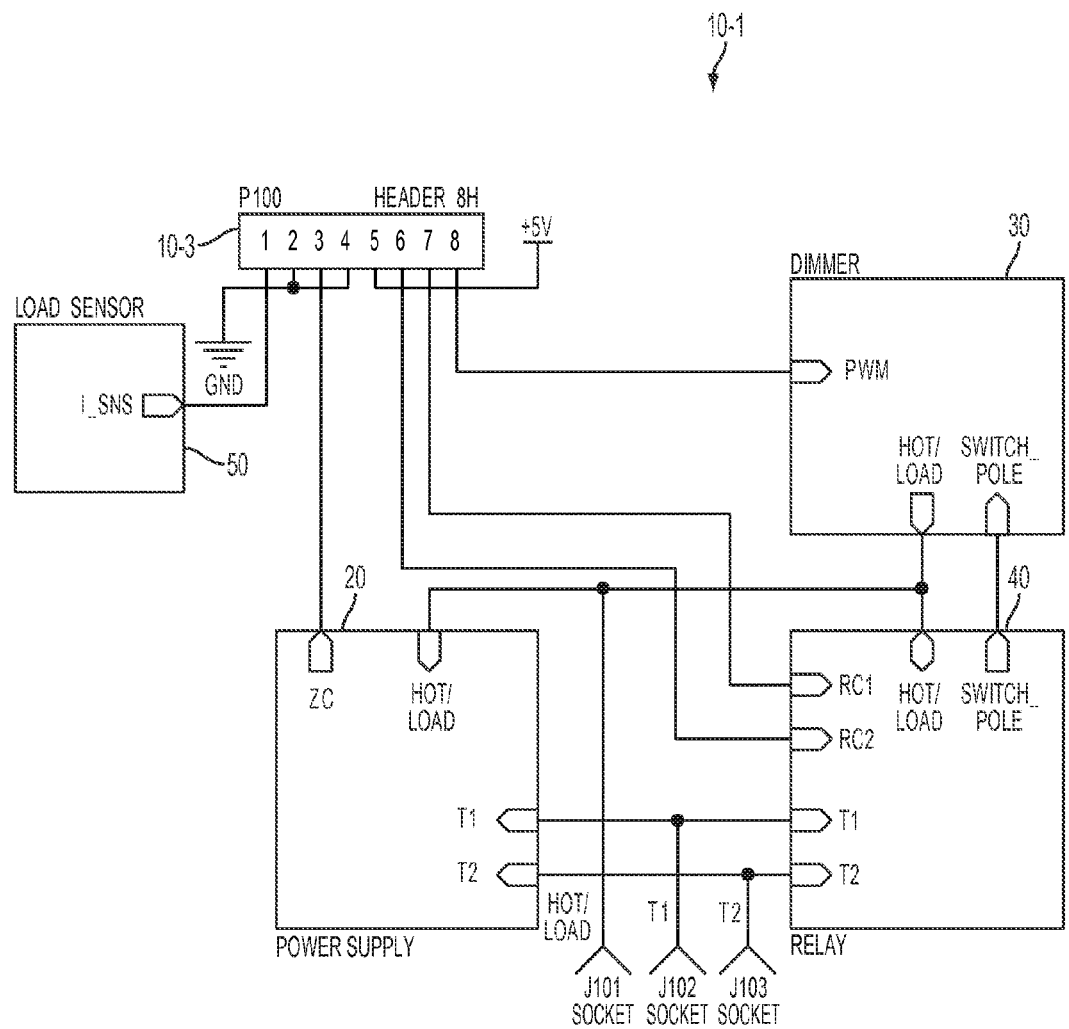
FIG. 11 is a block diagram of the AC power circuitry in accordance with a second embodiment of the present invention.

As embodied herein and depicted in FIG. 11, a block diagram of the AC power circuitry in accordance with another embodiment of the present invention is disclosed. This embodiment is identical to the one depicted in FIG. 2A with the exception that there is no neutral terminal or ground terminal available for circuit reference. Thus, this device 10 may be employed in a retrofit/remodeling project wherein the existing device box does not include a neutral conductor.

Figure 12:
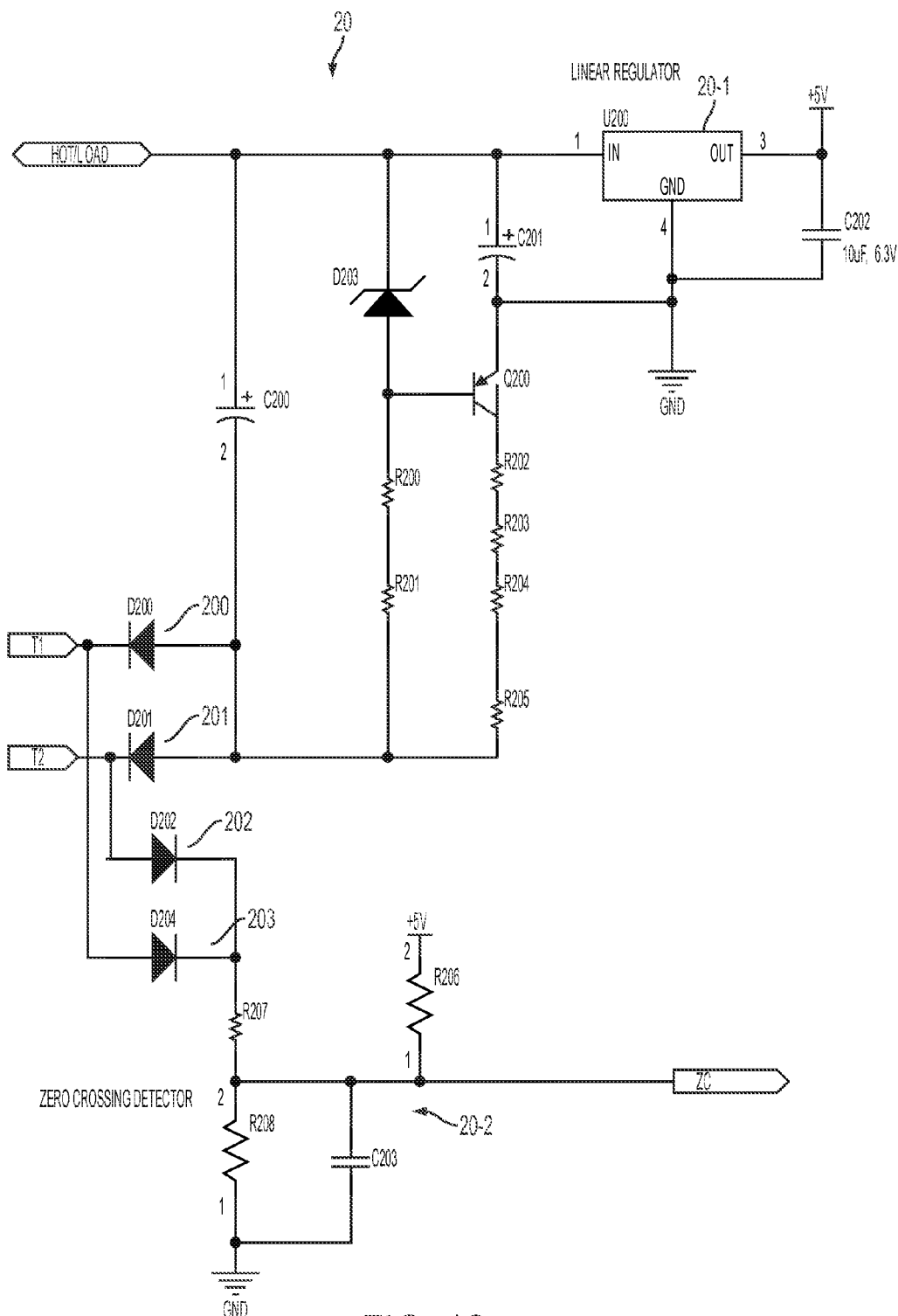
FIG. 12 is a detailed circuit diagram of a power supply in accordance with the second embodiment of the present invention.

Referring to FIG. 12, a detailed circuit diagram of the power supply depicted in FIG. 11 is disclosed. Because there is no neutral connection, two less diodes are required. The zero-cross detection circuit 20-2 is essentially the same as the one depicted in FIG. 5. The linear regulator circuit produces a virtual ground node approximately 24V below the Hot/Load terminal. D203 is biased with R200 and R201 to produce 24V, and Q200 provides current amplification and improved load regulation compared with a zener regulator acting alone. U200 further regulates the 24V down to 5V for use by the dimmer control circuitry. R202-R205 provide current limiting in the event of a short circuit on 24V or 5V.

Figure 13:
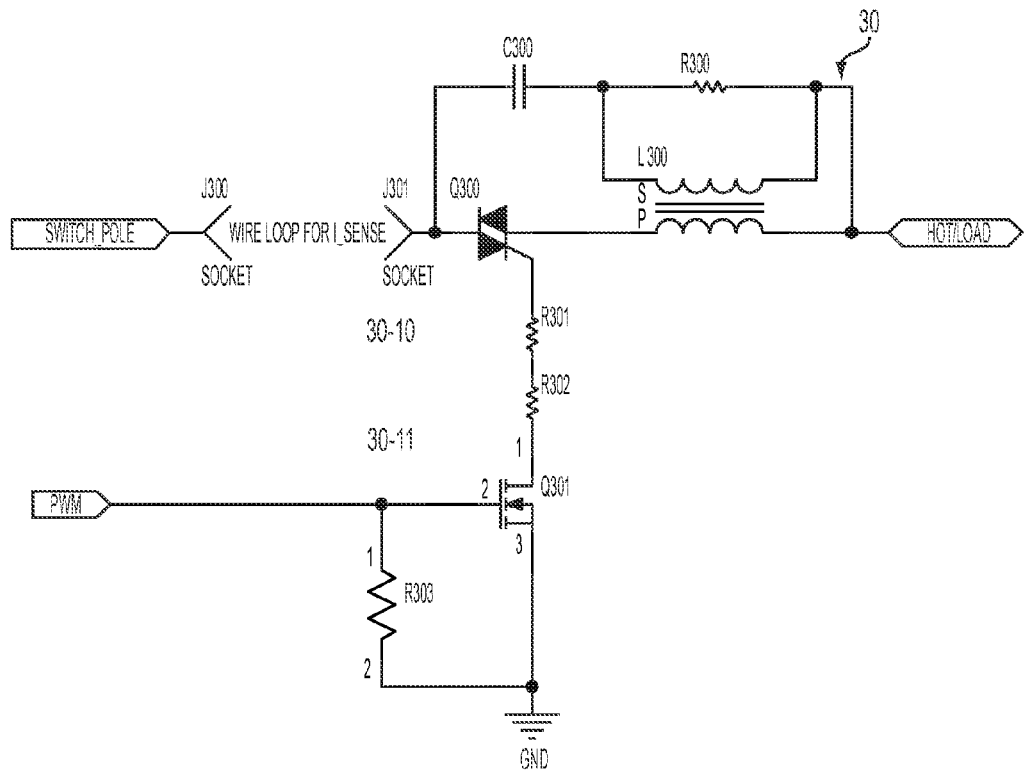
FIG. 13 is a detailed circuit diagram of a dimmer circuit in accordance with the second embodiment of the present invention.

Referring to FIG. 13, a detailed circuit diagram of the dimmer circuit 30 depicted in FIG. 11 is disclosed. As before, the microcomputer 110-1 controls the dimmer circuit 30 by way of the PWM signal. The PWM signal is at logic levels (+5V, GND) and controls the operation of transistor 30-1. When transistor 30-11 is turned ON at a predetermined point in the AC half cycle, an appropriate amount of current is provided to the triac 30-10 to turn it ON such that dimmed power is provided to the load. L300, R300, and C300 implement RFI filtering to minimize electromagnetic interference into nearby electronic equipment.

Figure 14:
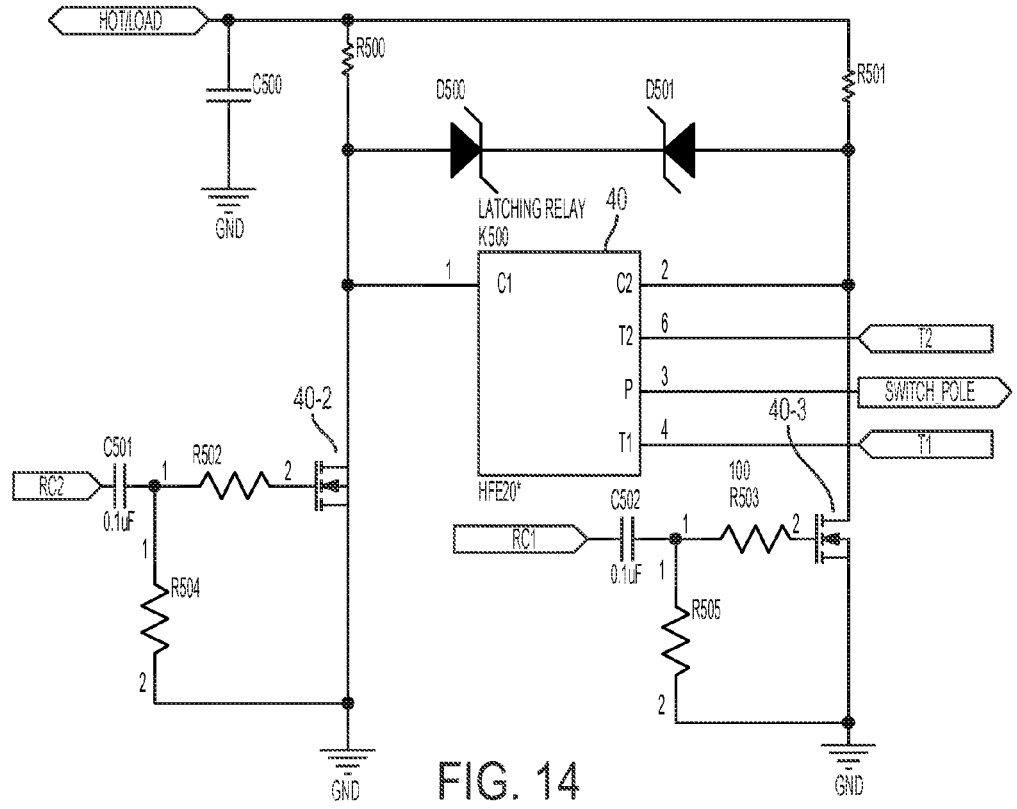
FIG. 14 is a detailed circuit diagram of a switch relay in accordance with the second embodiment of the present invention.

Referring to FIG. 14, a detailed circuit diagram of the switch relay depicted in FIG. 11 is disclosed. This circuit is identical to the one depicted in FIG. 7. Thus, no further description is required with the exception that the transistors 40-2 and 40-3 are connected to the HOT/LOAD terminal instead of the rectified HVDC signal (FIG. 7). As stated previously, the circuit's ground reference is 24V below the Hot/Load terminal; therefore this configuration provides 24V for driving the relay coil.

Figure 15A:
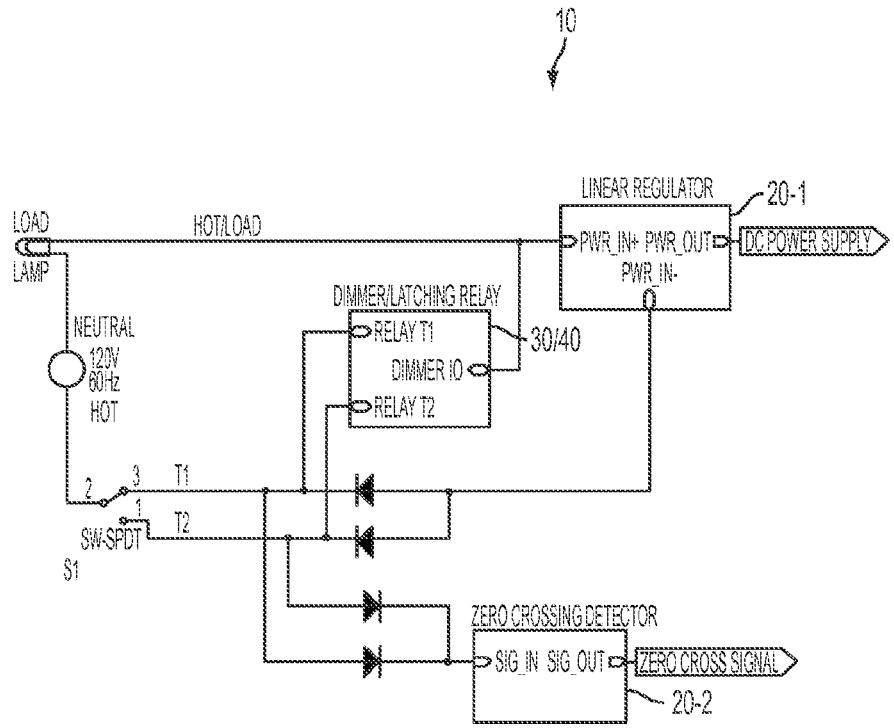
FIGS. 15A-15B are diagrammatic depictions of another three-way switch arrangement in accordance with the present invention.
Figure 15B:
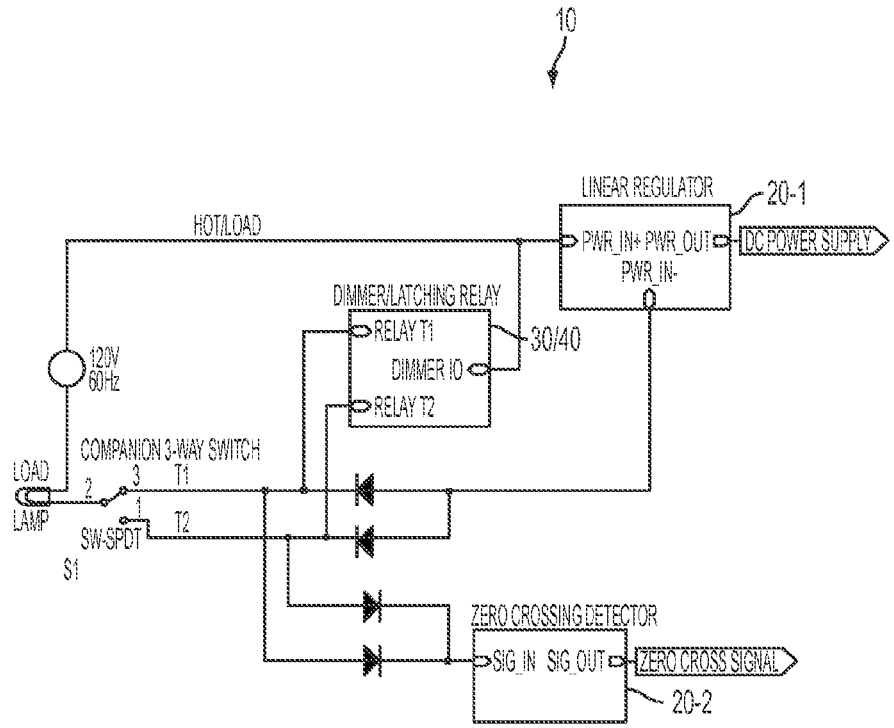

As embodied herein and depicted in FIGS. 15A-15B, diagrammatic depictions of another three-way switch arrangement in accordance with the present invention are disclosed. These diagrams illustrate that the embodiment of FIG. 11 may replace either switch S1 or switch S2 in FIG. 10A. This capability is enabled by the diode arrangement 200-203 and the analysis is similar to the one provided in conjunction with FIGS. 10A-10C.

Figure 16:
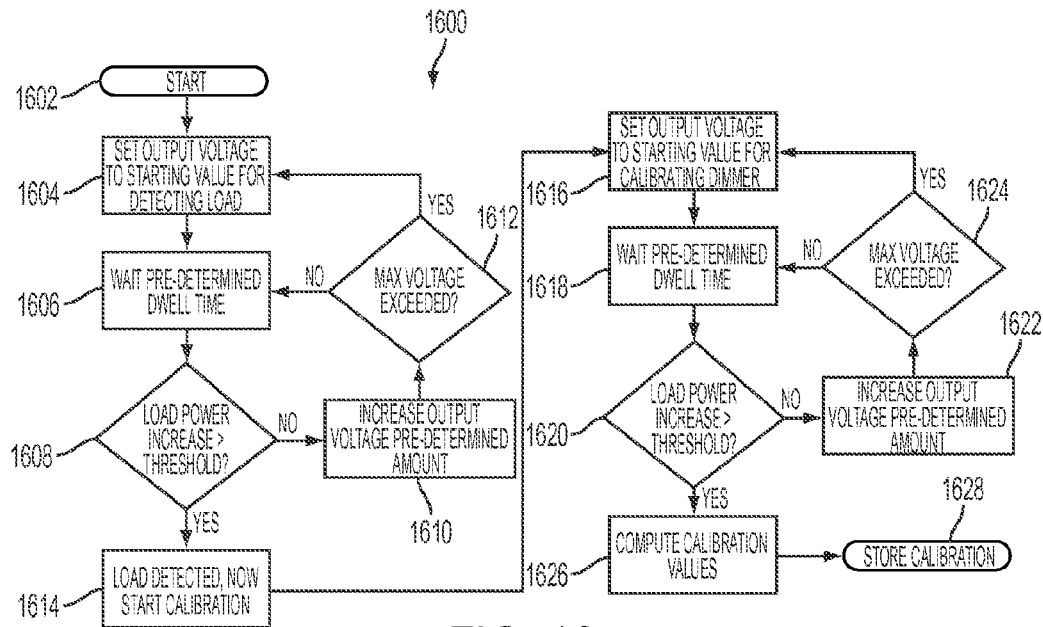
FIG. 16 is a flow chart diagram illustrating a software auto-calibration sequence in accordance with the present invention.

As embodied herein and depicted in FIG. 16, a flow chart diagram illustrating a software auto-calibration sequence 1600 in accordance with the present invention is disclosed. In step 1602 the device is energized and in step 1604 the microcontroller sets the duty cycle of the PWM pulse at an initial value that may be thought of as an idling value. In step 1606, the microcomputer 110-1 waits a predetermined time to determine if the load current is detected. In steps 1608-1612, the PWM pulse width is increased until either the load current is detected or a maximum width value is exceeded. If the maximum width value is exceeded, the microcontroller 110-1 assumes that the load is turned OFF by the companion switch (S1 or S2) and goes back to the initial PWM setting in step 1604. The cycle is repeated until the load current is detected in step 1614. The microcontroller 110-1, of course, knows the PWM value when load current is detected.

Load current detection is achieved when the threshold detector 112-1 finds that the I SNS signal from sensor 50 reliably exceeds the threshold. In one embodiment, I SNS is sampled 1000 times over a second. If at least 800 of the samples do not indicate load presence, the lamp is either off or flickering, and the PWM width is widened for an approximately 10 VRMS step increase in voltage to the lamp. This process of checking threshold detector and widening the PWM step keeps repeating until the lamp is either reliably on, meaning at least 800 samples indicating load presence, or until the maximum width is exceeded. The hunting stops at about 70 VRMS.

As has been described, the automatic calibration process can be accomplished in a matter of seconds. In one embodiment the calibration is initiated when an upstream breaker is opened momentarily and then closed to restore the voltage on the dimmer's power supply. In another embodiment, the automatic calibration takes place when a button on the dimmer is actuated by the user. In another approach, the automatic calibration takes place each time a switch is toggled to apply power to the load.

The ultimate voltage at which the lamp is reliably on is indicative of the type of load in use. For example, if the absolute value of the load current is low, it may indicate that the load is an LED lamp. As another example, how many of the samples are progressively indicating load presence from one step to the next may indicate the type of load.

The present invention may also determine if the device is a capacitive load device if, when set in a forward phase mode it detects current spikes. Conversely, if the device is pre-set to operate in reverse phase there will be current spikes if an inductive load is used.

The present invention may also determine the type of load on the basis of whether or not there is an inrush current when the load is turned on. The inrush characteristic can be compared against curves held in memory, e.g. the characteristic curve for a tungsten filament load. Unlike traditional incandescent bulbs, modern high-efficiency bulbs such as CFLs and LEDs do not turn on smoothly as their terminal voltage is increased from zero volts. Rather, these bulbs turn on abruptly at a turn-on voltage that is a function of the bulb design. For example, one manufacturer's LED bulb may turn on at 40Vrms, while another manufacturer's LED bulb may turn on at 60Vrms. Additionally, if the bulb voltage is maintained at approximately the turn-on voltage, bulb flashing may occur.

When high-efficiency bulbs are used in conjunction with Light Dimmers, it is desirable that the dimmer's output voltage never drops below a stable turn-on voltage for the bulb being used. Dimmers designed for use with these high-efficiency bulbs are typically calibrated at the factory to accomplish this requirement; that is, a specific low-end voltage is programmed into each dimmer based on the load type that the dimmer is designed to operate with. Dimmers that are intended to be used with varying load types can be developed using multiple strategies, such as: Calibrate the minimum dimmer output voltage during manufacturing to a level so high that all bulbs will turn on with no flashing at this minimum voltage—the downside of this approach is that the resulting dimming range will be unacceptably narrow for many load types. Design a feature into the dimmer that allows the end user to calibrate the dimmer after installation—the downside of this approach is that it burdens the user with extra work at installation. Also, this approach may result in unacceptable dimmer operation if the user fails to perform the calibration properly.

A calibration algorithm can be embedded into the light dimmer so that the dimmer automatically calibrates itself for the load being used. This auto-calibration can occur when power is first applied to the dimmer after installation. To implement this, the dimmer estimates the power being delivered to the load as the dimmer automatically increments up its output voltage. When a sudden increase in load power is sensed, the dimmer determines that its output voltage is now at or near the load's turn-on voltage, and calibrates itself accordingly.

The following pages illustrate one possible implementation that utilizes a current sensor to estimate load power, and a microcontroller to perform the calibration and control the dimming. This implementation is suitable for use in either single pole or 3-way switch installations.

Figure 17:
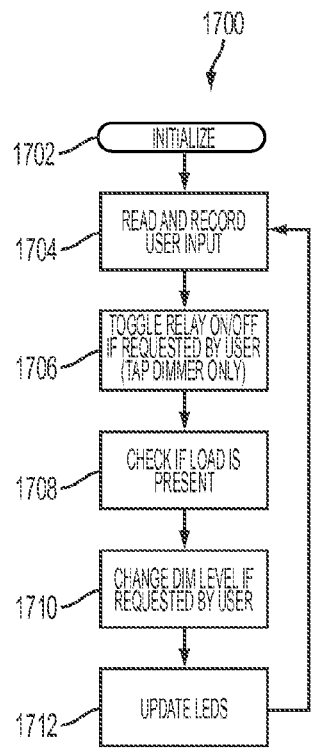
FIG. 17 is a flow chart diagram illustrating a software main program in accordance with the present invention.

As embodied herein and depicted in FIG. 17 is a flow chart diagram illustrating a software main program in accordance with the present invention is disclosed. After initialization and calibration, the microcomputer 110-1 reads and records the user input from, e.g., the button inputs described herein. If an ON/OFF command is issued by the user, the microcomputer 110-1 directs the relay circuit 40 accordingly. After determining if a load current is present, the computer 110-1 adjusts the PWM dimmer setting in accordance with user commands and updates the display LEDs accordingly. This process is performed continually thereafter.

Figure 18:
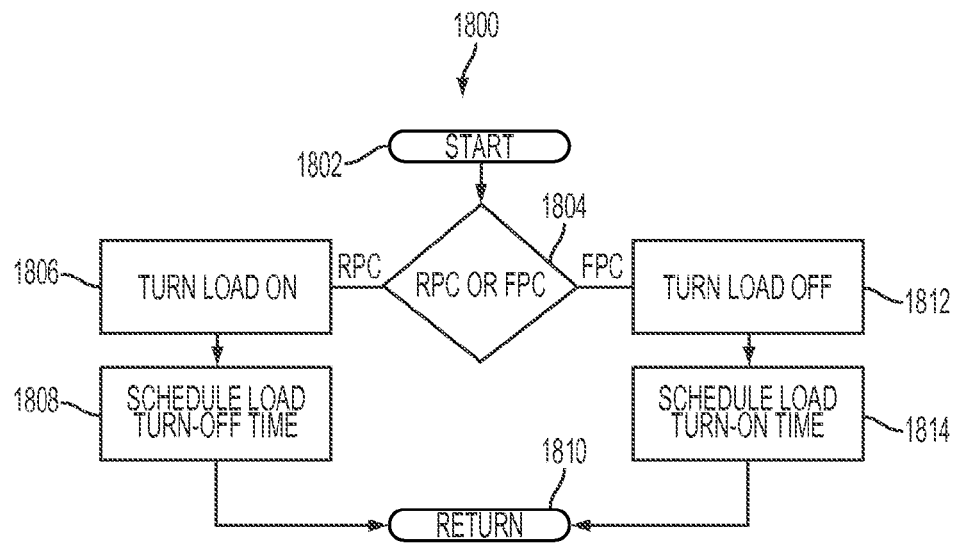
FIG. 18 is a flow chart diagram illustrating a software zero cross interrupt routine in accordance with the present invention.

As embodied herein and depicted in FIG. 18 is a flow chart diagram illustrating a software zero cross interrupt routine 1800 in accordance with the present invention is disclosed. In step 1804, the microcomputer 110-1 determines whether device 10 should operate in forward phase control (FPC) or in reverse phase control (RPC) using any one of the methods described herein. In the forward phase, the load current is switched ON a predetermined time after the zero-crossing of the AC half-cycle and turned OFF at the next zero-crossing of the AC waveform. Conversely, in reverse phase control, the load current is turned ON immediately after the zero-crossing is detected and turned OFF at a predetermined time before the next zero-crossing is detected. The predetermined time intervals described above can be implemented by scheduling a software load timer interrupt.

Figure 19:
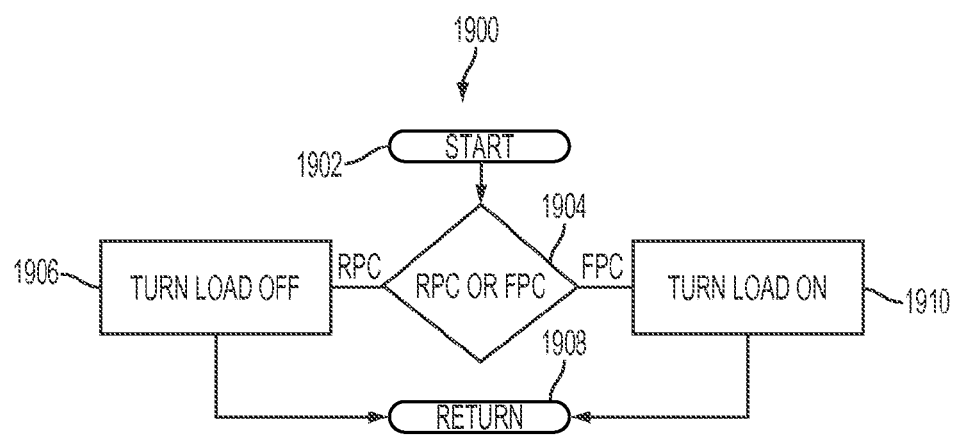
FIG. 19 is a flow chart diagram illustrating a software load timer interrupt routine in accordance with the present invention.

As embodied herein and depicted in FIG. 19 is a flow chart diagram illustrating a software load timer interrupt routine in accordance with the present invention is disclosed. As an extension to discussion on FIG. 18 above, the load timer interrupt turns the load current off when operating in reverse phase, and turns the load current on when operating in forward phase.

Figures 20, 21:
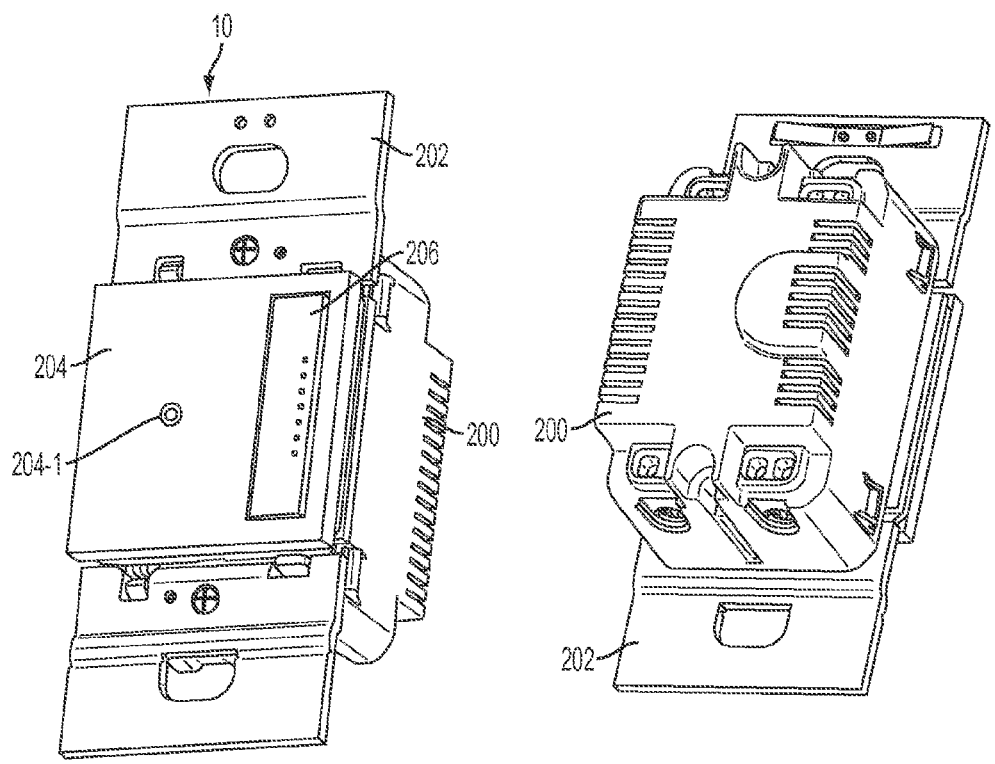
FIG. 20 is a front isometric view of a power control device in accordance with an embodiment of the present invention.
FIG. 21 is a rear isometric view of the power control device depicted in FIG. 20.

As embodied herein and depicted in FIG. 20, a front isometric view of a power control device 10 in accordance with an embodiment of the present invention is disclosed. Device 10 includes a switch cover 204 disposed on heat sink assembly 202. The power handling PCB 10-1 is disposed under the heat sink 202 and within the back body member 200. FIG. 21 is a rear isometric view of the power control device depicted in FIG. 20 and shows the back body member 200 and the heat sink 202.

Figures 22, 23:
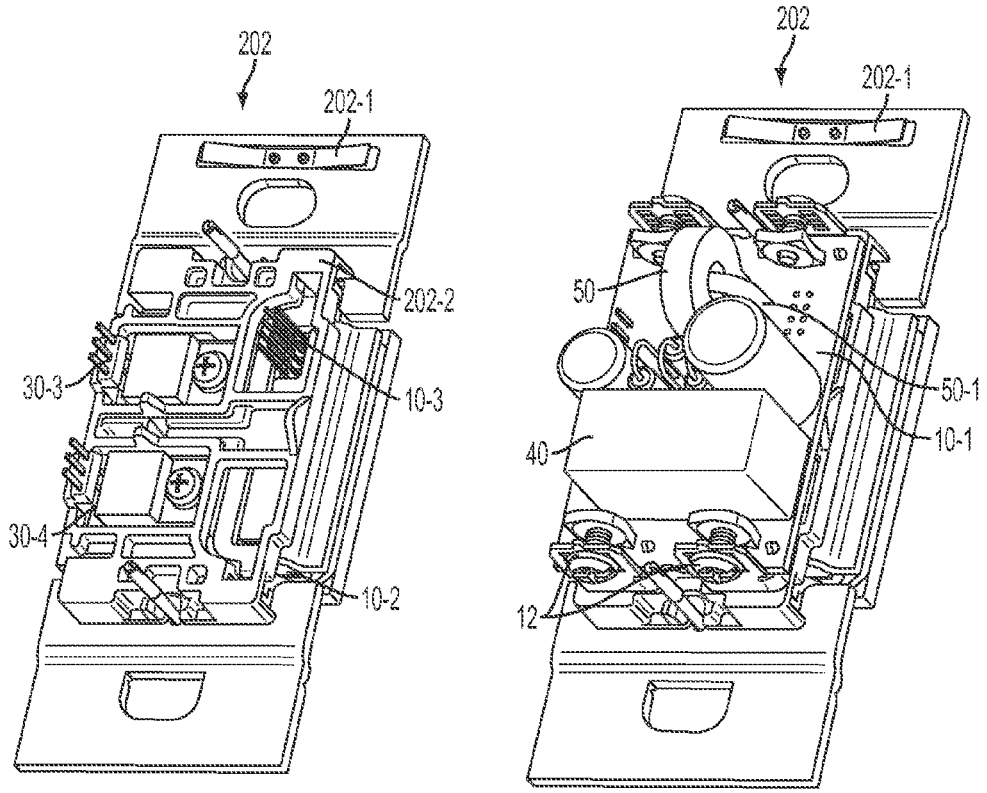
FIG. 22 is a rear isometric view of the heat sink assembly of the power control device depicted in FIG. 20.
FIG. 23 is a rear isometric view of the heat sink assembly and the power handling printed circuit board of the power control device depicted in FIG. 20.

Referring to FIG. 22, a rear isometric view of the heat sink assembly of the power control device depicted in FIG. 20 is disclosed. The separator member 202-2 is connected to the front of the heat sink 202 and the pins of the MOSFETs 30-3, 30-4 and the interface circuit 10-3 extend through the separator 202-2 such that they may be coupled to the PCB 10-1.

In FIG. 23, a rear isometric view of the heat sink assembly is shown with the power handling printed circuit board 10-1 added. In this view, the sensor 50, the sensor wire 50-1, the relay 40 and various other components are shown as being disposed on the power handling PCB 10-1. Note that ground clip spring 202-1 is attached to the rear side of the heat sink 202. The spring clip is configured to engage a front portion of a frame assembly (not shown in this view). Reference is made to U.S. patent Ser. No. 13/680,675, which is incorporated herein by reference as though fully set forth in its entirety, for a more detailed explanation of A MODULAR ELECTRICAL WIRING DEVICE SYSTEM and the associated framing system.

Figure 24:
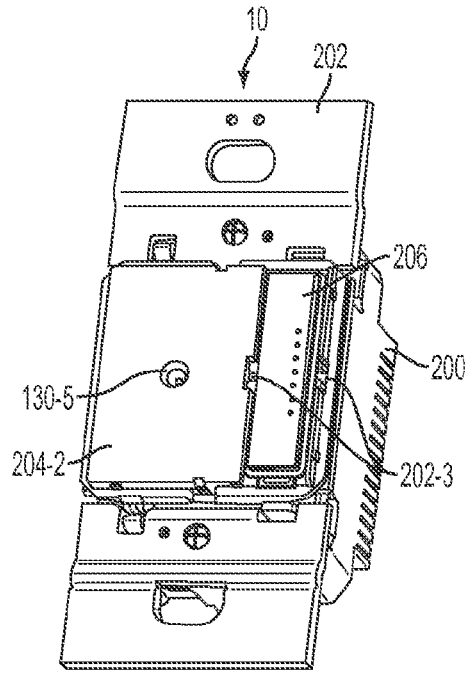
FIG. 24 is a front isometric view of FIG. 20 with the ON/OFF actuator cover removed.
Figure 25:
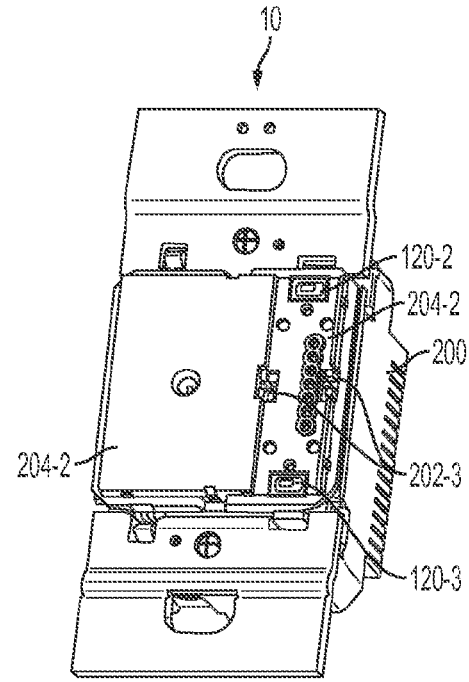
FIG. 25 is a front isometric view of FIG. 20 with the ON/OFF actuator cover and the dimmer cover removed.

Referring to FIG. 24, a front isometric view of FIG. 20 is disclosed with the aesthetic cover 204 removed. Thus, the switch actuator 204-2 is shown with a central aperture that accommodates the locator LED 130-5. Note also that the dimmer cover assembly 206 is seated within a portion of the switch actuator 204-2. FIG. 25 is a front isometric view of FIG. 20 with the aesthetic actuator cover 204 and the dimmer cover 206 removed such that the dimmer control switches 120-2, 120-3 are accessible. Snap elements 202-3 are formed in the separator 202-2 and are use to engage the dimmer cover 206 and secure it to the assembly. Snap elements 202-3 are also pivot points to allow dimmer cover 206 to rotate in order to actuate dimmer control switches 120-2,120-3.

Figure 26:
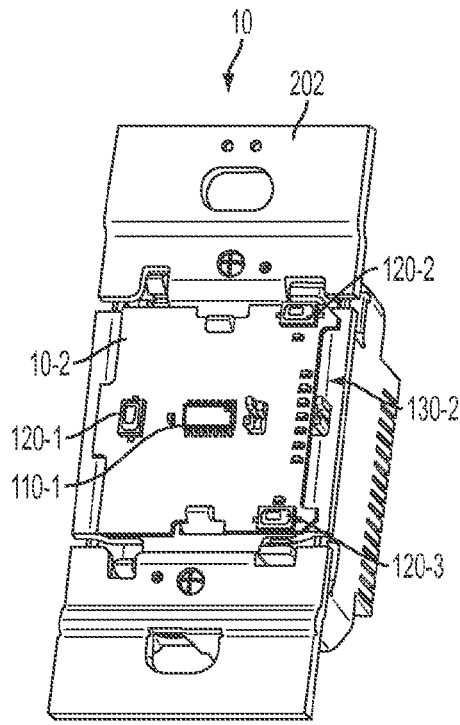
FIG. 26 is a front isometric view of the heat sink assembly of FIG. 22 disposed within the back body member.

Referring to FIG. 26, a front isometric view of the heat sink assembly disposed within the back body member 200 is shown. Note that the logic PCB 10-2 is mounted to the front side of the heat sink 202. The microcomputer 110-1 is mounted on the PCB 10-2. The switches 120-1, 120-2 and 120-3, as well as LED indicators 130-2, are mounted on the PCB 10-2.

Figure 27:
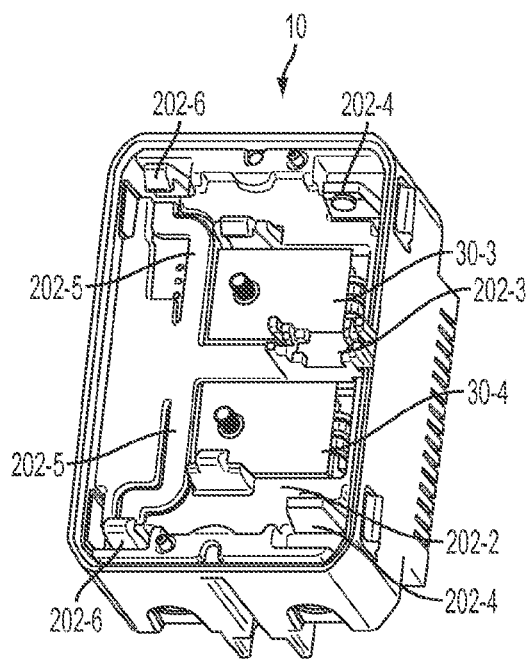
FIG. 27 is a front isometric view of the power handling printed circuit board of FIG. 23 disposed within the back body member of the device of FIG. 20.

Referring to FIG. 27, a front isometric view of the device with the heat sink 202 removed, revealing separator member 202-2. The MOSFETS 30-3 and 30-4 are electrically connected to the PCB 10-1 and are shown as extending through the openings in the separator 202-2. The snap elements 202-3 are clearly shown in this view, and as noted above, accommodate snap-in elements formed in the dimmer cover 205 (not shown). The separator 202-2 also includes trunions 202-4 at either end. The trunions 202-4 accommodate the snap-openings 204-12 in the functional actuator 204-2 (See FIG. 29). Trunions 202-4 allow the functional actuator 204-2 to rotate to allow engagement of switch 120-1. Finally, the separator 202-2 includes a spring arm 202-5 that is configured to bias the functional actuator 204-2 upwardly.

Figure 28:
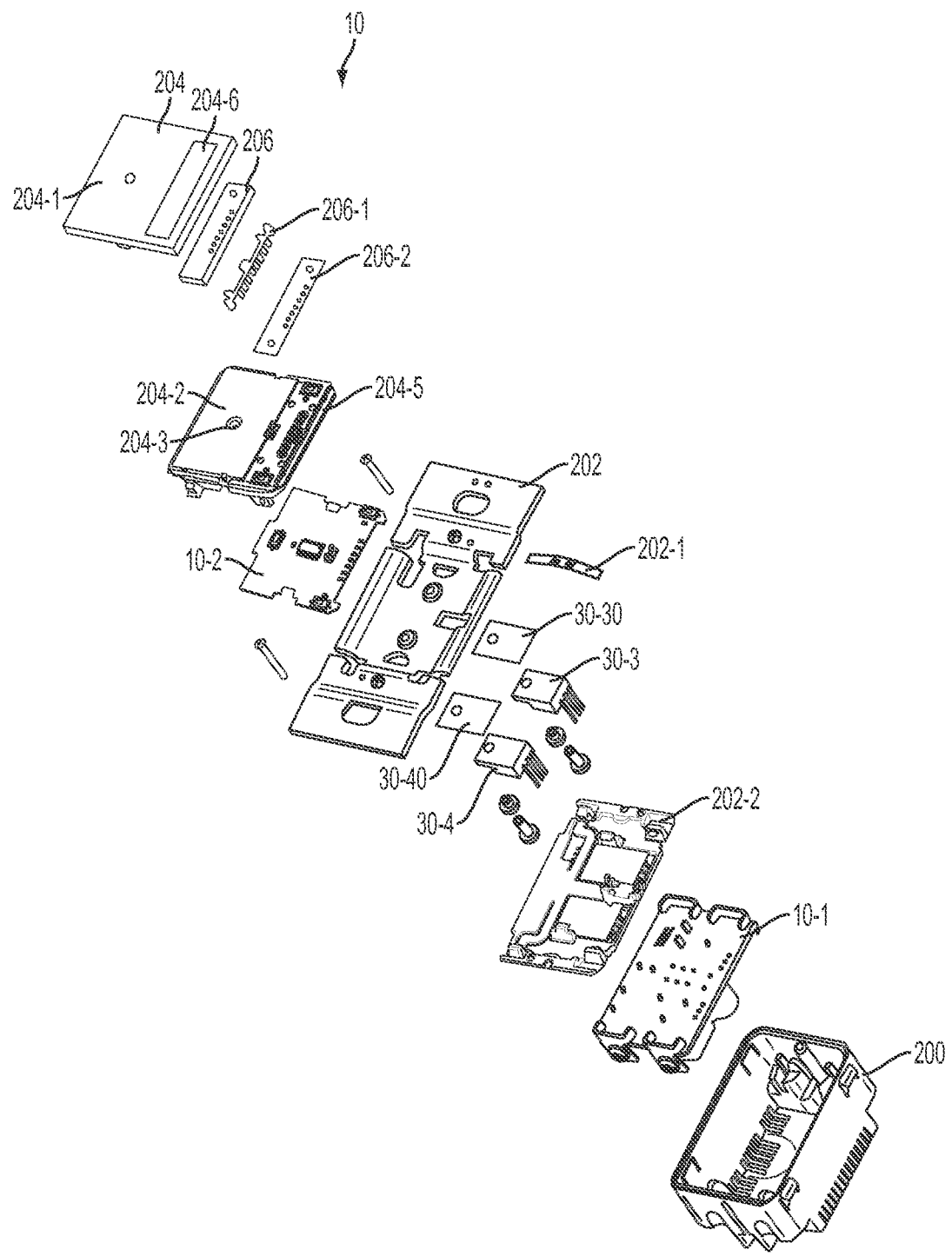
FIG. 28 is an exploded view of the power control device depicted in FIG. 20.

Referring to FIG. 28, an exploded view of the power control device depicted in FIG. 20 is disclosed. The device 10 includes an aesthetic cover 204 that includes an LED lens 204-1 disposed in a central portion thereof. In an embodiment of the invention, lens 204-1 is a thin section of cover 204. The aesthetic cover further includes an opening 204-6 that accommodates the dimmer switch cover 206. The dimmer switch cover 206 includes a light pipe structure 206-1 that is held in place within the dimmer cover 206 by an alignment mask 206-2. The dimmer cover 206, the light pipe 206-1 and the alignment mask 206-2 are configured to be disposed within opening 204-5 formed in one side of the functional switch actuator 204-2. The functional switch actuator 204-2 includes a central opening 204-3. The logic PCB 10-2 is shown over top of the front side of the heat sink 202. The two MOSFETs 30-3 and 30-4 are coupled to the bottom of heat sink 202 by insulator members 30-3, 30-40, respectively. Of course, the MOSFETs 30-3 and 30-4 are electrically connected to the power handling PCB 10-1 via openings in the separator 202-2. The entire assembly is disposed within back body member 200. See FIGS. 24-27.

Referring to FIG. 29, a bottom isometric view of the functional actuator 202-2 is disclosed. The central portion of the functional switch 204-2 includes a central opening 204-3 that may accommodate an LED. At one side of the functional switch 204-2 there are snap-in elements (204-10, 204-11) that are configured to mate with the snap-elements 202-6 formed in the separator (See FIG. 27) Snap-in elements (204-10, 204-11) are bearing surfaces for springs 202-6 and also to limit the spring-biased rotation. Recessed surface 204-13 engages the switch 120-1 when cosmetic actuator 204 is depressed, opposing the spring biased rotation. At the opposite side, there are trunion mounts 204-12 that accommodate the trunions 202-4 formed in the separator 202-2. The trunions allow the functional switch 204-2 when switch 120-1 is manually actuated. The tray portion 204-5 which accommodates the dimmer cover assembly 206 includes light isolation openings 204-6 for the light pipe element 206-1.

In reference to FIGS. 30-31, detailed isometric views of the dimmer actuator cover 206 depicted in FIG. 20 are disclosed. FIG. 30 shows the underside of the dimmer cover 206. An alignment mask 206-2 is disposed overtop the light pipe structure 206-1 to prevent undesired light leakage from the light pipe. The down button light pipe 206-5, the up button light pipe 206-6 and the LED bar graph light pipes 206-7 are shown extending through the mask portion 206-2. In FIG. 31, the mask portion 206-2 is removed such that the light pipe structure 206-1 can be clearly seen within the dimmer cover 206.

Referring to FIG. 32, a cross-sectional view of the power control device 10 depicted in FIG. 20 is disclosed. This view shows the aesthetic cover 204 disposed over the functional switch 204-2 and other elements underneath, such as the logic PCB 10-2, separator 202-2 and the power handling PCB 10-1. Aesthetic cover 204 is configured to be removable by the user as is dimmer cover 206.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed:

1. An electrical wiring device for use with an external three-way switch in a three-way switching arrangement, the device comprising:

a housing assembly including a plurality of terminals at least partially disposed therein, the plurality of terminals including a reversible terminal, a first traveler terminal and a second traveler terminal, the reversible terminal being configured to be coupled to an AC power source or an electrical load;

a power regulation circuit coupled to the plurality of terminals, the power regulation circuit being configured to provide at least one reference voltage derived from the AC power source and a zero cross signal substantially corresponding to a zero-crossing of an the AC power cycle of the AC power source;

a switching mechanism including a first throw coupled to the first traveler terminal, a second throw coupled to the second traveler terminal, and a common pole coupled to the reversible terminal, the switching mechanism being configured to connect the first traveler terminal to the common pole in a first switch state or the second traveler or the second traveler terminal to the common pole in a second switch state;

an AC power routing circuit coupled between the plurality of terminals and the power regulation circuit, the AC power routing circuit being configured to direct AC power to the power regulation circuit when the reversible terminal is connected to either the AC power source or the electrical load and when the switching mechanism and the external three-way switch are in any switch state; and a regulation circuit coupled to the power regulation circuit, the regulation circuit being configured to regulate an amount of power provided to the electrical load as a function of the zero-crossing signal.

2. The device of claim 1, wherein the AC power routing circuit includes a zero-cross routing circuit, the power regulation circuit derives the zero crossing signal from the zero-cross routing circuit.

3. The device of claim 2, wherein the zero-cross routing circuit is coupled to each of the reversible terminal, the first traveler terminal and the second traveler terminal via a diode.

4. The device of claim 1, wherein the AC power routing circuit includes a switching arrangement configured to direct AC power from the first traveler terminal or the second traveler terminal to the power regulation circuit when the reversible terminal is connected to the electrical load, the switching arrangement substantially blocking the AC power from being provided to the reversible terminal.

5. The device of claim 4, further comprising a load current sensor in series with the common pole and configured to provide a current sensor signal based on a current propagating through the electrical load.

6. The device of claim 5, wherein the regulation circuit is configured to determine a mode of operation based at least in part on the current sensor signal.

7. The device of claim 6, wherein the mode of operation includes a reverse phase mode, the regulation circuit being configured to regulate an amount of power by providing power to the electrical load during a predetermined portion of the AC line cycle, the predetermined portion of the AC line cycle beginning at the zero-crossing and ending at a predetermined phased angle of the AC line cycle.

8. The device of claim 7, wherein the current sensor signal includes at least one parameter indicative of the electrical load type.

9. The device of claim 7, wherein the electrical load type is selected from a group of electrical load types in the reverse phase mode including electronic low voltage (ELV) lighting loads.

10. The device of claim 6, wherein the mode of operation includes a forward phase operation, the regulation circuit being configured to regulate an amount of power by providing power to the electrical load during a predetermined portion of the AC line cycle, the predetermined portion of the AC line cycle beginning at a predetermined phased angle of the AC line cycle and ending at the zero-crossing.

11. The device of claim 10, wherein the current sensor signal includes at least one parameter indicative of the electrical load type.

12. The device of claim 11, wherein the electrical load type is selected from a group of electrical load types in a forward phase mode including incandescent, magnetic low voltage (MLV), fluorescent electronic ballast (EFL), LED, compact florescent lights (CFL) and halogen loads.

13. The device of claim 6, wherein the mode of operation includes a calibration mode, the regulation circuit being configured to enter a calibration mode when the device transitions from the device deenergized state to the device energized state.

14. The device of claim 1, wherein the AC power routing circuit includes a switching arrangement configured to direct AC power from the reversible terminal to the power regulation circuit when the reversible terminal is connected to the AC power source, the switching arrangement substantially blocking the AC power from being provided to the first traveler terminal and the second traveler terminal.

15. The device of claim 14, further comprising a load current sensor in series with the common pole and configured to provide a current sensor signal based on a current propagating through the electrical load.

16. The device of claim 15, wherein the regulation circuit is configured to determine a mode of operation based at least in part on the current sensor signal.

17. The device of claim 16, wherein the mode of operation includes a reverse phase mode, the regulation circuit being configured to regulate an amount of power by providing power to the electrical load during a predetermined portion of the AC line cycle, the predetermined portion of the AC line cycle beginning at the zero-crossing and ending at a predetermined phased angle of the AC line cycle.

18. The device of claim 17, wherein the current sensor signal includes at least one parameter indicative of the electrical load type.

19. The device of claim 18, wherein the electrical load type is selected from a group of electrical load types in the reverse phase mode including electronic low voltage (ELV) lighting loads.

20. The device of claim 16, wherein the mode of operation includes a forward phase operation, the regulation circuit being configured to regulate an amount of power by providing power to the electrical load during a predetermined portion of the AC line cycle, the predetermined portion of the AC line cycle beginning at a predetermined phased angle of the AC line cycle and ending at the zero-crossing.

21. The device of claim 20, wherein the current sensor signal includes at least one parameter indicative of the electrical load type.

22. The device of claim 21, wherein the electrical load type is selected from a group of electrical load types in a forward phase mode including incandescent, magnetic low voltage (MLV), fluorescent electronic ballast (EFL), LED, compact florescent lights (CFL) and halogen loads.

23. The device of claim 16, wherein the mode of operation includes a calibration mode, the regulation circuit being configured to enter a calibration mode when the device transitions from the device deenergized state to the device energized state.

24. The device of claim 1, further comprising:
at least one variable control mechanism coupled to the housing assembly, the at least one variable control mechanism being configured to adjustably select a user adjustable load setting, the user adjustable load setting being adjustable between a minimum setting and a maximum setting; and
at least one series pass element coupled to the regulation circuit, the at least one series pass element being configured to provide load power to the electrical load in accordance with the user load setting.

25. The device of claim 1, wherein the at least one variable control mechanism alters the load power between a low limit of adjustment and a maximum limit of adjustment, the regulation circuit automatically entering a calibration mode whenever the voltage source is coupled to the device during which the regulation circuit automatically increases the amount of load power until the current reaches a pre-determined current threshold defining a corresponding voltage threshold, the regulation circuit automatically establishing the low limit of adjustment in a relationship with the voltage threshold.

26. The device of claim 1, wherein the switching mechanism is a latching relay.

27. The device of claim 1, wherein the power regulation circuit further comprises a load current sensor coupled to the reversible terminal and configured to provide a current sensor signal based on a current propagating through the electrical load.

28. The device of claim 27, wherein the current sensor signal occurs when the external three-way switch is switching the electrical load on, the power regulation circuit being configured to increase voltage to the electrical load from a low limit to a user adjustable limit at a predetermined rate of increase.

29. The device of claim 27, wherein the current sensor signal occurs when a user actuates the switching mechanism, the electrical load turning off in response after a predetermined delay period.

30. An electrical wiring device for use with an external three-way switch in a three-way switching arrangement, the device comprising:
a housing assembly including a plurality of terminals at least partially disposed therein, the plurality of terminals including a reversible terminal, a first traveler terminal and a second traveler terminal, the reversible terminal being configured to be coupled to an AC power source or an electrical load;
a power regulation circuit disposed in the housing and including a series pass element coupled to the reversible terminal;
a switching mechanism coupled to the power regulation circuit and switchable between a first switch state where the series pass element is coupled to the first traveler terminal and a second switch state where the series pass element is coupled to the second traveler terminal; and an AC power routing circuit coupled to the reversible terminal, the first traveler terminal and the second traveler terminal, the AC power routing circuit having a return path coupled to the neutral terminal or the ground terminal, the AC power routing circuit being configured to direct AC power to the power regulation circuit whether the reversible terminal is connected to the AC power source or the electrical load and whether the switching mechanism is in the first switch state or the second switch state.

31. The device of claim 30, wherein the power regulation circuit further includes a zero cross detector for detecting a zero-crossing of an AC power cycle of the AC power source, the zero-cross detector being coupled to the reversible terminal, the first traveler terminal and the second traveler terminal.

32. The device of claim 31, wherein the zero-cross detector is coupled to the reversible terminal, the first traveler terminal and the second traveler terminal via diodes.

33. The device of claim 30, further comprising a load current sensor in series with the series pass element and configured to provide a current sensor signal based on a current propagating through the electrical load.

34. The device of claim 33, wherein the current sensor signal occurs when the external three-way switch is switching the electrical load on, the power regulation circuit being configured to increase voltage to the electrical load from a low limit to a user adjustable limit at a predetermined rate of increase.

35. The device of claim 33, wherein the current sensor signal occurs when a user actuates the switching mechanism, the electrical load turning off in response after a predetermined delay period.

36. The device of claim 30, wherein the switching mechanism is a latching relay.

* * * * *